United States Patent
Ito et al.

(10) Patent No.: US 6,654,031 B1
(45) Date of Patent: Nov. 25, 2003

(54) METHOD OF EDITING A VIDEO PROGRAM WITH VARIABLE VIEW POINT OF PICKED-UP IMAGE AND COMPUTER PROGRAM PRODUCT FOR DISPLAYING VIDEO PROGRAM

(75) Inventors: Tsutomu Ito, Kodaira (JP); Hirotada Ueda, Kokubunji (JP)

(73) Assignee: Hitachi Kokusai Electric Inc., Tokyo (JP)

(*) Notice: Subject to any disclaimer, the term of this patent is extended or adjusted under 35 U.S.C. 154(b) by 524 days.

(21) Appl. No.: 09/689,799

(22) Filed: Oct. 13, 2000

(30) Foreign Application Priority Data

Oct. 15, 1999 (JP) ............................................ 11-293331

(51) Int. Cl.[7] .......................... G06F 3/14; G06T 15/70; G06T 15/20
(52) U.S. Cl. ........................ 345/723; 345/427; 345/473; 345/474; 345/722
(58) Field of Search ................................. 345/723, 726, 345/719, 720, 722, 848, 850, 851, 730, 731, 732, 757, 427, 419, 420, 473, 475, 474, 952, 956, 957; 715/513, 500.1

(56) References Cited

U.S. PATENT DOCUMENTS

| | | | | |
|---|---|---|---|---|
| 5,729,471 A | * | 3/1998 | Jain et al. | ................ 345/419 X |
| 5,850,352 A | * | 12/1998 | Moezzi et al. | ............... 345/419 |
| 6,144,375 A | * | 11/2000 | Jain et al. | ................. 715/500.1 |
| 6,331,853 B1 | * | 12/2001 | Miyashita | .................... 345/427 |
| 6,466,239 B2 | * | 10/2002 | Ishikawa | ..................... 345/850 |
| 6,535,210 B1 | * | 3/2003 | Ellenby et al. | ............. 345/419 |

* cited by examiner

*Primary Examiner*—Raymond J. Bayerl
(74) *Attorney, Agent, or Firm*—Antonelli, Terry, Stout & Kraus, LLP

(57) ABSTRACT

A method of editing a video program including computer graphics animation, having the steps of setting a camera view point as a view point of images of the video program broadcasted and a user's view point for editing images picked up from the camera view point, the user's view point being different from the camera view point, storing the images picked up from the camera view point and user's view point, respectively, in a storage unit, reading out the images of the camera view point from the storage unit and displaying the images thereof on a screen of a display unit, reading out the images of the user's view point from the storage unit and displaying the images thereof on the screen of the display unit, and editing the images picked up by the camera view point in accordance with the images picked up from the user's view point.

11 Claims, 21 Drawing Sheets

FIG. 21

FILE (F)　MAIN IMAGE (M)　EVENT (E)　CELL (C)　HELP (H)

STUDIO SETUP

SETUP MODE: CHARACTER SETUP / CHARACTER ADD

CHARACTER A
NAME: BOB   DIS-POSITION x 0.638  z -0.092  d -8.800
MODEL NAME: Masa.act
SPEECH/TONE: JAPANESE MALE   STATE: STANDING CHARACTER B
NAME: MARY   DIS-POSITION x -0.102  z -0.160  d 9.000
MODEL NAME: Mina.act
SPEECH/TONE: ENGLISH CHILD   STATE: STANDING STUDIO SET: spark.iv DEFAULT   OK   Cancel

SUPER-IMPOSE   SOUND   NARRATION   MISCELLANEOUS SETTINGS

START

TITLE PATTERN BLACK

USER'S VIEW POINT PISTION   POSITION TOP   PROJECTION TRANSFORMATION   PERS. PROJECTION   VIEW POINT ADJUST

VIEW POINT

END

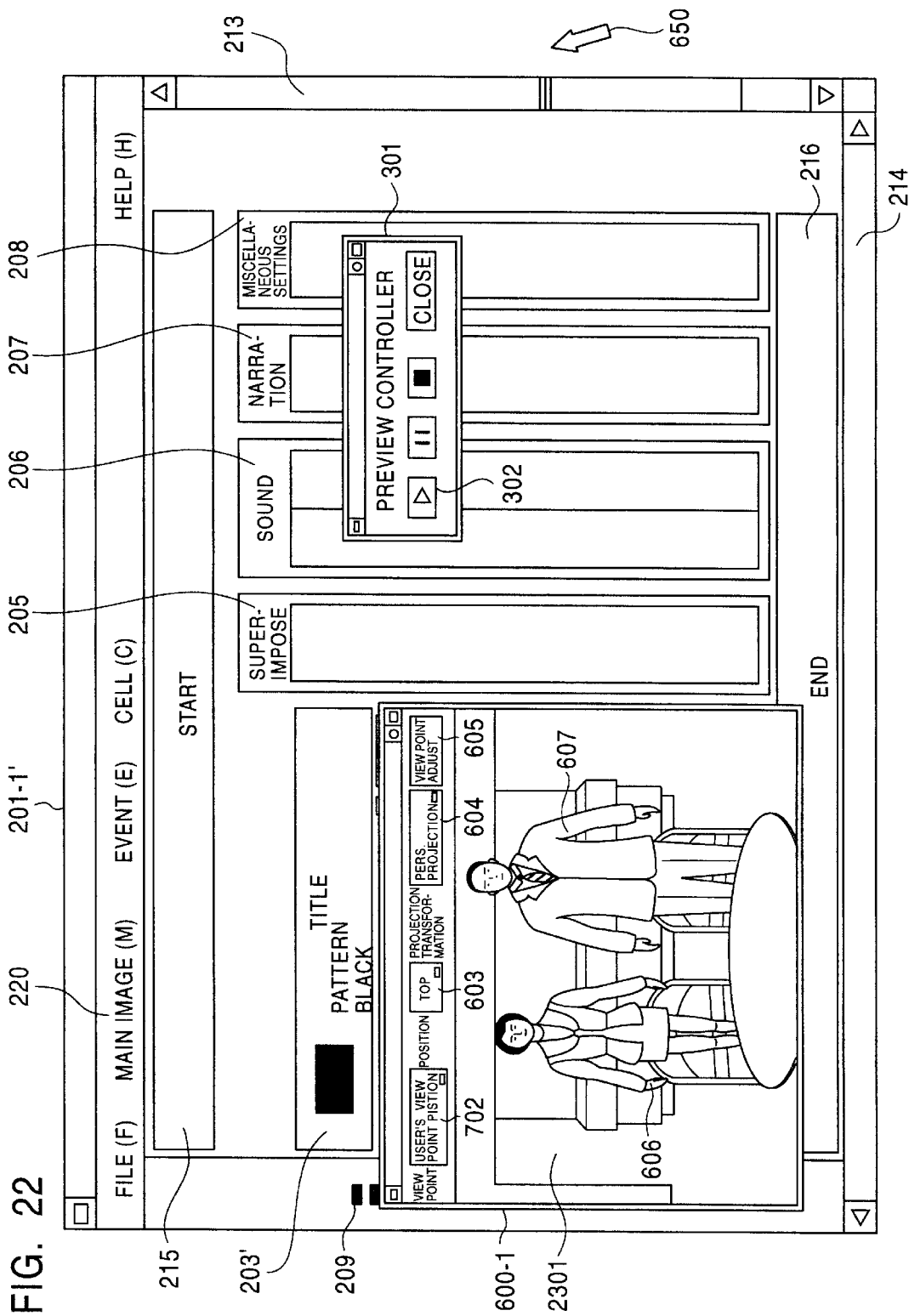

METHOD OF EDITING A VIDEO PROGRAM WITH VARIABLE VIEW POINT OF PICKED-UP IMAGE AND COMPUTER PROGRAM PRODUCT FOR DISPLAYING VIDEO PROGRAM

CROSS-REFERENCE TO RELATED APPLICATIONS

The present application relates to U.S. patent application Ser. No. 09/337,331 filed on Jul. 21, 1999.

BACKGROUND OF THE INVENTION

The present invention generally relates to edition of image information and a moving image editing apparatus for editing the same. More particularly, the present invention is concerned with a television program image editing system employed for production of video program or programs and the like.

In recent years, a television program creating/editing system has been developed by integrating consolidatedly the computer graphics (hereinafter termed CG in short) animation technology, voice synthesis technology, moving image regeneration technology and so for making possible the production of video programs such as television programs thoroughly with the aid of a computer.

Typical ones of the image data editing systems for enabling production of television programs through interaction between a user or operator and a computer are disclosed in Ueda et al's "DESK TOP TV PROGRAM CREATION-TVML (TV PROGRAM MAKING LANGUAGE) EDITOR-", Association for Computing Machinery, September 1998, Toshiaki Yokoyama et al's "PROGRAM-GENERATION/ INTERACTIVE EDITING SYSTEM BASED ON TELEVISION PROGRAM MAKING LANGUAGE-TVML", Third Intelligence Information Media Symposium, December 1997, and Toshiaki Yokoyama et al's "MAN-MACHINE INTERFACE FOR TV PROGRAM MAKING LANGUAGE (TVML)", Society Convention of The Institute of Electronics and Communication Engineers of Japan, September 1997.

With the TVML editing systems or TVML editors disclosed in the literatures mentioned above, it is possible to create or produce programs such as TV or video programs developed on a so-called virtual studio, i.e., computer graphics studio or CG studio, with the aid of a computer and a display screen apparatus connected to the system without using a real studio and real characters on the basis of information concerning the animation characters and the CG studio set stored in a RAM of large capacity such as a hard disk device by using voice synthesizing tools, animation creating tools and others.

Images of a program being edited or created can be displayed on the display screen of the TVML editor. However, the images which can be displayed are limited only to those taken in a predetermined photographing or pick-up direction, i.e., those images viewed only from a view point of camera-disposed in a virtual studio. In this conjunction, it is noted that in the course of creation of images for a video program and the edition thereof, there often arises the necessity of confirming the images of the program being created from other different view point(s) (photographing direction(s) and position(s)) of an additional camera(s) in order to move the CG characters making appearance in the program with high accuracy and/or to realize matching of speeches of the characters accurately with the motions or actions thereof. For changing the photographing direction or the camera position in the virtual studio, the editor or operator is forced to perform input operations for changing predetermined value of the view point of the camera (hereinafter also referred to as the camera's view point) upon every changing of the photographing direction and the camera position to thereby change correspondingly the photographing direction of the image to be displayed. As the images viewed from the different camera view points, there may be mentioned, by way of example, images viewed from directly overhead in the CG studio, close-up images of mouth portions of the characters, images located outside of the frame of the image being edited and so forth. After confirmation of the motion or action of the character by displaying these particular images viewed from the different view points as described above, the editing of the image taken from the original camera view point is resumed and continues. Obviously, the above-mentioned procedure is very troublesome to the editor with a remarkable burden being imposed on him or her. Besides, the editing work takes a long time. In this conjunction, it is also noted that the images viewed from the particular view points such as mentioned above are scarcely used in practical program creation. In this case, the work of checking the images of the special view-point cameras described above will ultimately result in fruitless effort.

SUMMARY OF THE INVENTION

In the light of the state of the art described above, it is an object of the present invention to provide a video program editing method and a computer program product for displaying a video program as edited which are imparted with such capability or facility that in the course of creating a program or edition of images, image(s) viewed from other view point(s) desired by operator and differing from the camera view point of the image being displayed can instantaneously be displayed and which thus allow creation of the program such as TV or video program as well as edition-relevant works to be carried out in a much simplified and facilitated manner within a significantly reduced time.

In view of the above and other objects which will become apparent as the description proceeds, it is taught according to the present invention that the image of the editor's camera view point and the images(s) viewed from view points set as described previously (hereinafter also referred to as the user's view point) are defined to thereby set the data concerning these view points are set up. The camera view point represents the view point of reproduced image of a video program being edited as in the case of the conventional TVML editor or the view point of an image picked up and broadcasted. On the other hand, with the user's view point, it is intended to mean the view points only for the edition which intrinsically differ from the camera view point. According to an aspect of the present invention, such arrangement is provided that the camera view point and the user's view point(s) can mutually be changed over in the course of displaying and editing a video program through manipulation of the information which can be displayed on the editing screen.

In a preferred mode for carrying out the present invention, data concerning the coordinates and the directions of the camera view point and the user's view point(s) in a three-dimensional coordinate system pertinent to a CG studio are prepared or set up. The preset direction concerning any given user's view point can be altered or modified by the editor (operator). Further, the user's view point can be moved in accompanying motion or action of the character making appearance on the CG studio. When the editing work is carried out with monitoring the image of the user's view point the results of the edition are automatically reflected in the image of the camera view point.

Thus, according to an aspect of the present invention, there is provided a method of editing a video program including computer graphics animation, wherein the method comprises the steps of setting a camera view point as a view point of images of the video program broadcasted and a user's view point for editing images picked up from the camera view point, the user's view point being different from the camera view point, storing the images picked up from the camera view point and user's view point, respectively, in a storage unit, reading out the images of the camera view point from the storage unit and displaying the images thereof on a screen of a display unit, reading out the images of the user's view point from the storage unit and displaying the images thereof on the screen of the display unit, and editing the images picked up by the camera view point in accordance with the images picked up from the user's view point.

Further, according to a second aspect of the present invention, there is provided a computer program product comprising a computer usable medium having computer-readable program code means embodied therein for displaying images for editing a video program including computer graphics animation, comprising the steps of; wherein said computer-readable program code means includes;

means for setting a camera view point as a view point of images of said video program broadcasted and a user's view point for editing images picked up from said camera view point, said user's view point being different from said camera view point;

means for storing said images picked up from said camera view point and user's view point, respectively, in a storage unit;

means for reading out said images of said camera view point from said storage unit and displaying said images thereof on a screen of a display unit;

means for reading out said images of said user's view point from said storage unit and displaying said images thereof on the screen of said display unit; and means for editing said images picked up by said images picked up by said user's view point.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 21 is a view showing, by way of example, a preview window in the case where a CG studio is viewed from a user's view point positioned at a mid point on the ceiling side of the CG studio;

FIG. 22 is a view showing another example of the preview window generated in carrying out the video or TV program editing method according to an embodiment of the present invention.

DESCRIPTION OF THE EMBODIMENTS

Figure 1:
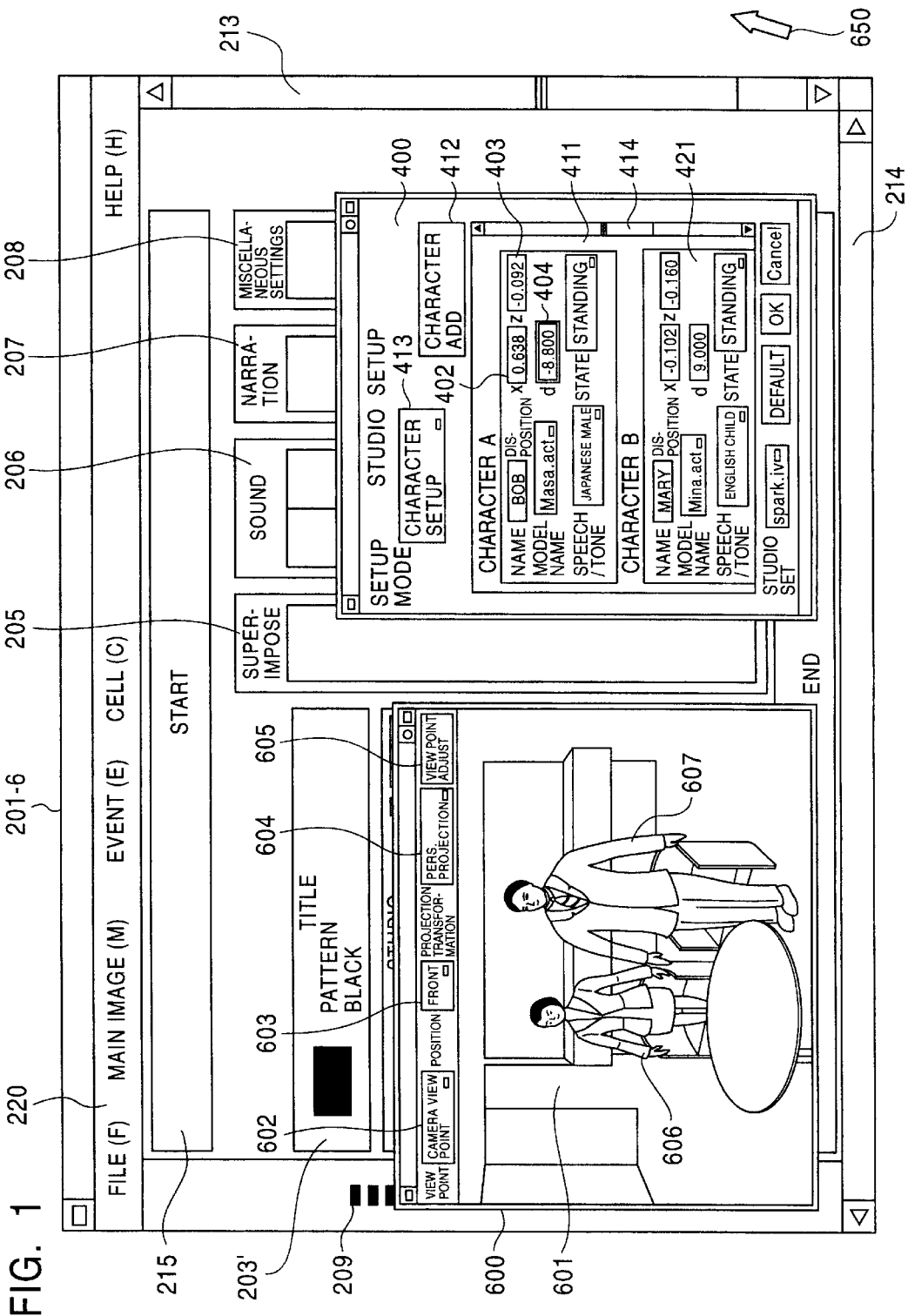
FIG. 1 is a view showing a typical edit display screen displayed for carrying out a video or TV program editing method according to an embodiment of the present invention.

Now, the present invention will be described in detail in conjunction with what is presently considered as preferred or typical embodiments thereof by reference to the drawings. In the following description, like reference characters designate like or corresponding parts throughout the several views, unless specified otherwise. Also in the following description, it is to be understood that such terms as "left", "right", "top", "bottom", "counterclockwise" and the like are words of convenience and are not to be construed as limiting terms.

The description will be made in the following order. At first, description will globally be made of the method of editing a video program containing computer graphics animations with which the present invention is concerned. In that case, a system configuration of the TVML (TeleVision program Making Language) editor which can be employed in carrying out the method of the present invention will firstly be described by reference to FIG. 2. Subsequently, referring to FIGS. 3 to 8, a procedure adopted conventionally for creating a video program for practical applications by using the TVML editor will be described while pointing out problems which may arise in the case where only the so-called camera view point is set. Finally, description will be directed to what is presently considered as the preferred embodiment of the present invention by reference to FIG. 1 and FIGS. 9 to 23 for elucidating in what manner the problems can be solved according to the teachings of the present invention.

Figure 2:
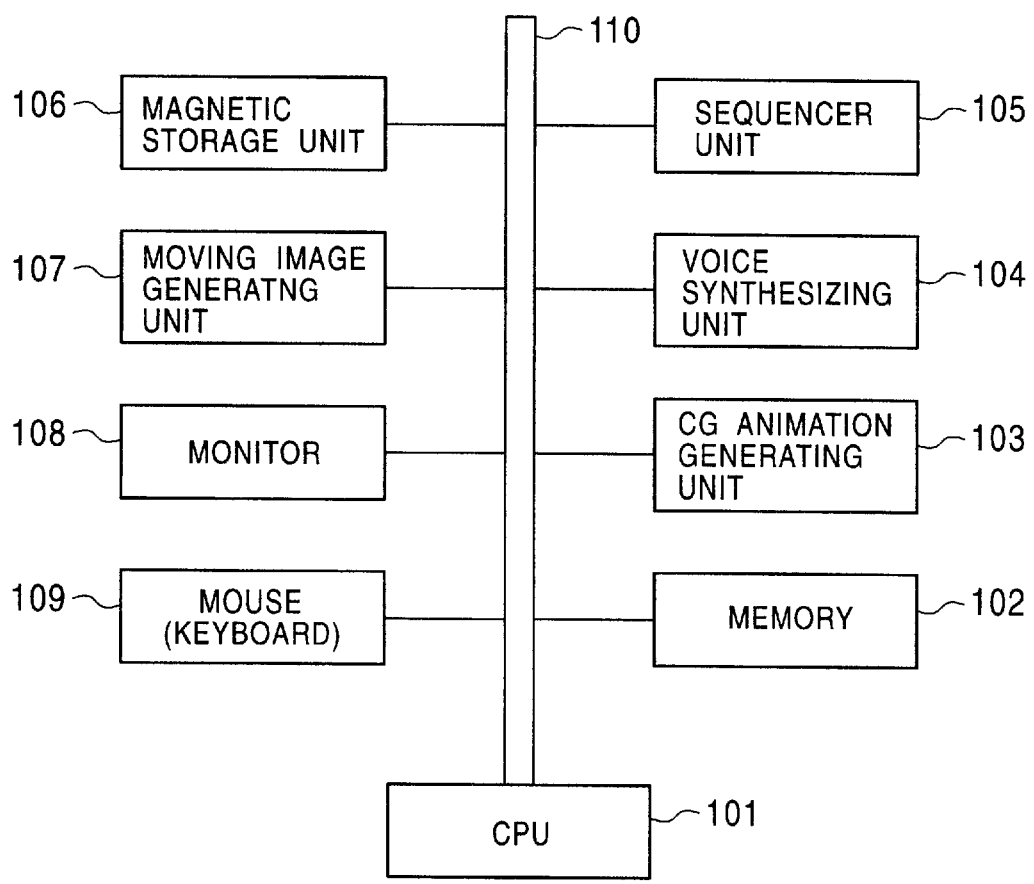
FIG. 2 is a block diagram showing generally and schematically a configuration of a TVML-based television program editing system.

A typical one of the television program creating/editing system based on TVML (TeleVision program Making Language) will be described by reference to FIG. 2 which shows generally and schematically a configuration of a television program editing apparatus or editor. In the figure, reference numeral 103 denotes a CG (computer graphics) animation generating unit designed for imparting animation to characters making appearance or cast and for generation of a studio set by resorting to the computer graphics technique (also referred to as the CG technique), numeral 104 denotes a voice synthesizing unit for generating speaking voices (speeches) of the cast characters, numeral 107 denotes a moving image generating unit for displaying a moving image edited in advance, numeral 102 denotes a memory for storing therein data or information concerning speeches and motions of the cast characters, and events of reproduction of moving images, in accordance with scenario scripts of a television program, numeral 105 denotes a sequencer unit designed for generating progressively and sequentially a television program by controlling the CG animation generating unit 103, the voice synthesizing unit 104 and the moving image generating unit 107 on the basis of the event information of the television program stored in the memory 102, numeral 108 denotes a monitor for displaying the generated television program as well as the data or information for edition of the program, numeral 109 denotes an input device such as a mouse, a keyboard or the like for issuing a command for reproduction (regeneration) to the sequencer unit as well as commands for edition of the event information of the television program stored in the memory 102, numeral 101 denotes a CPU (Central Processing Unit) for processing the data or information for edition of the program, the data or information being stored in the memory 102, numeral 106 denotes a magnetic storage unit for storing modeling data of the cast characters, data of the CG studio, the data or information of the moving images and the like, and reference numeral 110 denotes a bus for inter-connecting the units enumerated above.

With the television program editing apparatus or editor of the configuration described above, the television program producer (hereinafter referred to as the operator or user case by case) is capable of editing efficiently and effectively a television program through manipulation of the input device 109 by arraying individual scenes of the television program on the display screen of the monitor 108 in a time-serial sequence, generating the television program on the basis of the edited scene data and outputting the generated television program.

Figure 3:
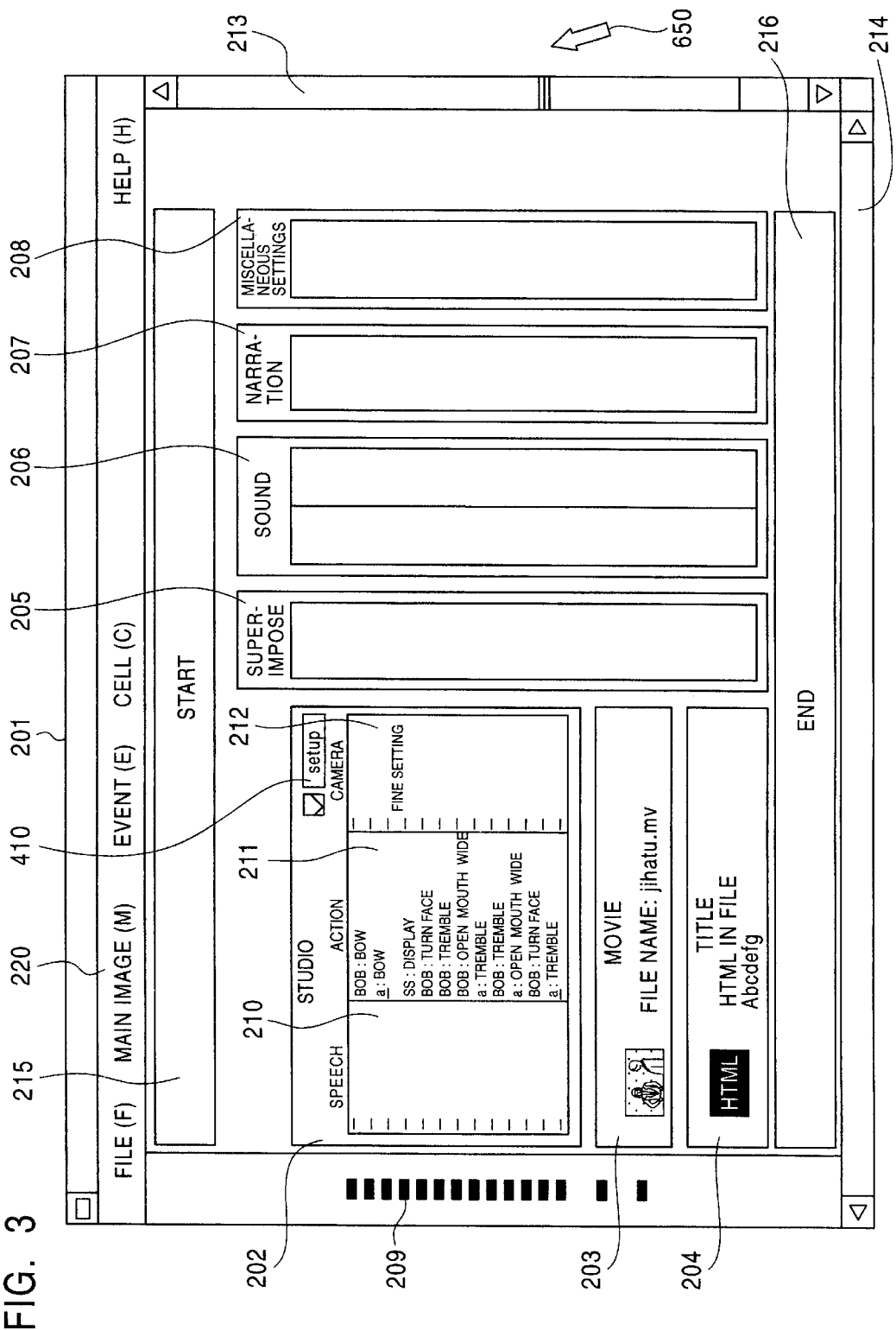
FIG. 3 is a view showing a basic edit display screen image generated in the TVML-based TV program editing system.

FIG. 3 is a view showing a typical example of the edit display screen image generated by the television program editing apparatus. More specifically, this figure shows a basic edit screen image displayed on the monitor of the television program editing apparatus. In the figure, reference numeral 201 generally denotes an edit display screen, numeral 202 denotes a studio block with the aid of which the operator can do such settings which make it possible for the CG characters to speak their parts and move or act and for the camera work, numeral 203 denotes a movie block designed for performing a reproduction (regeneration) control for an edited moving image which has been prepared in advance, numeral 204 denotes a title block utilized for controlling the displaying text information and a still picture displayed on the television screen, numeral 205 denotes a superimpose block designed for synthesization by superimposing a text (strings of letters or symbols) on an image to be outputted, numeral 206 denotes a sound block designed for controlling sound or music to be synthesized with the picture, numeral 207 denotes a narration block for adding narration to the images in the course of e.g. movie reproduction, numeral 208 denotes a miscellaneous setting block for adding other data or information in the event, numeral 209 denotes an event mark, numeral 210 denotes a speech setup field for setting speeches or words to be spoken aloud by the CG characters, numeral 211 denotes an action setup field for setting movements, performances, actions and the like of the CG characters, numeral 212 denotes a camera work setup field for setting camera works interiorly of the CG studio, numerals 213 and 214 denote sliders for sliding the image displayed on the monitor screen, numeral 215 denotes a start block for indicating the start of a program, numeral 216 denotes an end block indicating the end of the program, numeral 220 denotes a pull-down menu, numeral 410 denotes a setup button, and finally reference numeral 650 denotes a pointer indicating a position of concern in response to manipulation of the mouse which serves as the input device 109.

In the edit display screen 201 shown in FIG. 3, it is presumed that the time axis or base is taken in the vertical direction and that the television program is generated progressively in sequence from the top of the screen toward the bottom.

Referring to FIG. 3, a vertical block series of the studio block 202, the movie block 203, the title block 204 and others arrayed at the left side of the edit display screen 201 is for a picture to be outputted on a television screen. As can be seen in FIG. 3, the speech setup field 210 for setting the speeches of the CG characters, the action setup field 211 for setting motions or actions or activities of the CG characters and the camera work setup field 212 for setting the camera work interiorly of the CG studio are located within the studio block 202. Furthermore, the studio block 202, the movie block 203 and the title block 204 are each decomposed into several units, i.e., the so-called events in the vertical direction. In this conjunction, it should be mentioned that the event marks 209 mentioned previously are provided in one-to-one correspondence to the individual events, respectively. Basically, any one of the setting such as all the speeches and the actions of the characters can be done at one time each in correspondence to one event.

The television program created in such manner as described above can be checked or confirmed through a preview window which can be popped up by clicking twice (double-clicking) with the mouse the column (hereinafter also referred to as a cell) defined by the speech setup field 210, the action setup field 211 and the camera work setup field 212, respectively.

Figure 4:
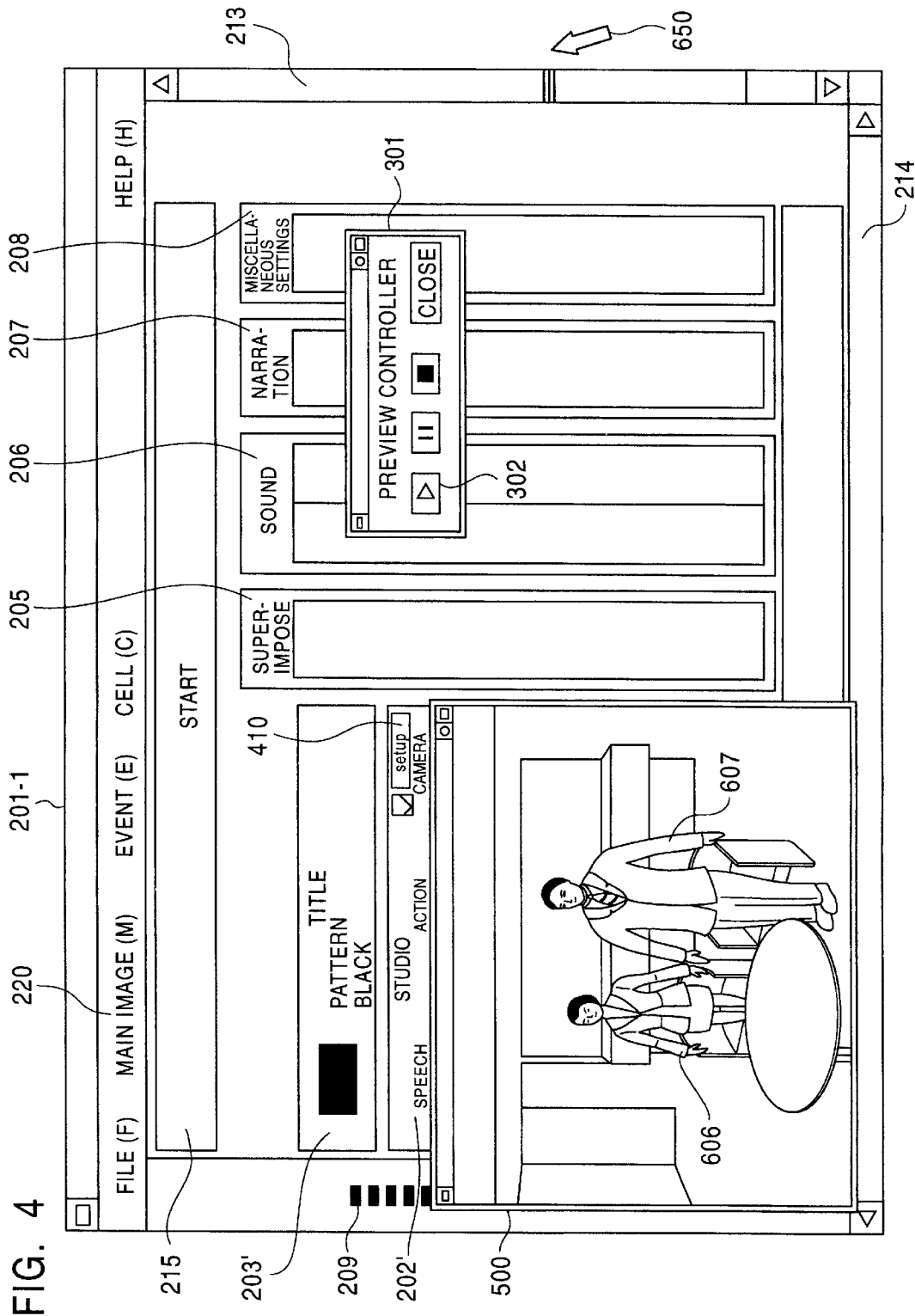
FIG. 4 is a view showing a preview window generated in the TVML-based TV program editing system.

FIG. 4 is a view showing a typical example of the preview window for monitoring the images of the program with the television program editing apparatus. In the figure, components like as or equivalent to those described hereinbefore by reference to FIG. 3 are designated by like reference numerals. The edit display screen is generally denoted by reference numeral 201-1 in this case. Further, in the figure, reference numeral 202' denotes a studio block, numeral 203' denotes a title block, numeral 500 denotes a preview window, numeral 301 denotes a preview control window, and reference numeral 302 denotes a play button.

The preview control window 301 is designed to be employed when the operator or user checks a created television program thoroughly from the start (the start block 215) to the end (the end block 216). This preview control window 301 can be popped up by selecting by clicking an item "PREVIEW" contained in the pull-down menu 220 disposed at the top of the edit screen field 201-1. Parenthetically, in the case of the pull-down menu shown in FIG. 4, illustration of the item "PREVIEW" is omitted. At this juncture, it is to be added that with the phrase "pull-down menu", it is intended to mean such a menu in which the title section thereof (e.g. "EVENT" contained in the pull-down menu 220) is constantly displayed, and when the title section ("EVENT") is clicked, a list of menu items is displayed, for thereby following a processing to be executed for one of the displayed items selected with the mouse click. In that case, the list of menu items makes disappearance simultaneously. Of course, the display of the original title can be resumed.

By clicking with the mouse the play button 302 of the preview control window 301, the television programs created are generated to be displayed succeedingly from one to another within the preview window 500 in the order of the events. The images as displayed within the preview window 500 are the very ones that are to be actually broadcast on television.

In this conjunction, it should further be mentioned that when the preview button 302 is clicked with the mouse after selecting a desired event mark 209, only images of the selected event mark 209 appearing within the selected or designated range are generated successively from the top to be thereby displayed. On the other hand, when the play button 302 is clicked with the mouse without selecting the event mark 209, all the images of all the events are generated successively in the order arrayed from the top to the bottom.

Parenthetically, the method of creating the television or video program with the TVML editor is described in more detail in co-pending U.S. patent application Ser. No. 09/337,331.

In the course of the program creation/edition work such as described above, there may arise such situation in which positions or posts of the CG characters in the CG studio have to be determined, for example. By way of example, in the case where the positions or allocations of the CG characters, disposition of the camera and the like are to be set up interiorly of the CG studio, this can be realized with the aid of a studio setup window. This studio setup window can be popped up for display by clicking a setup button 410 arranged at an upper right position within the studio block 202' (studio block 202 in the case of the screen display shown in FIG. 3) with the mouse. In that case, a leading or starting status of the studio block 202 is displayed within the preview window 500 with the concrete information thereof being displayed within the studio setup window.

Figure 5:
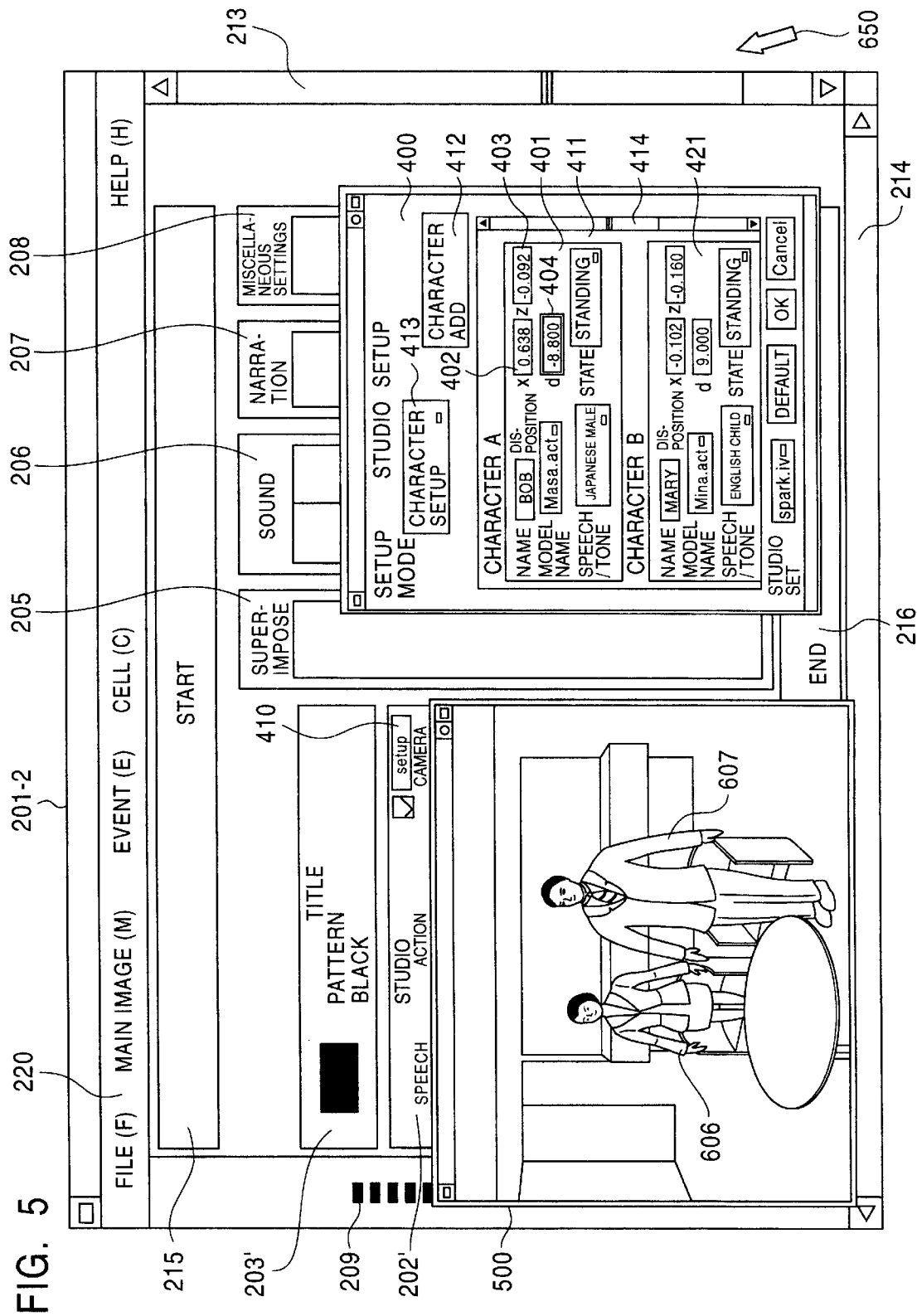
FIG. 5 is a view showing a studio setup window generated in the TVML-based TV program editing system.

FIG. 5 is a view showing a typical example of the studio setup window displayed on the television program editing apparatus. In this figure, components like as or equivalent to those described hereinbefore are affixed by like reference numerals. The edit display screen image is generally denoted by numeral 201-2. Further, in this figure, reference numeral 400 denotes a studio setup window, numeral 413 denotes a setting mode option menu, numeral 411 denotes a setup board column, numeral 607 denotes a CG character "A", numeral 606 denotes a CG character "B", numerals 401 and 421 denote CG character setup boards for setting the disposition and others for the character "A" 607 and the character "B" 606, respectively, and numeral 412 denotes a character add button for adding a CG character upon clicking thereof with the mouse when such addition of the CG character is required, wherein numeral 402 denotes an X-coordinate text field for setting the X-coordinate position of the CG character "A" 607 on the CG studio, numeral 403 denotes a Z-coordinate text field for setting the Z-coordinate position of the CG character "A" 607, and numeral 404 denotes a character attitude setup text field for setting the orientation or attitude of the CG character "A" 607. Of course, the CG character setup board 421 is of a similar structure. Finally, reference numeral 414 denotes a slider manipulated for changing or modifying the display position of the setup board column 411.

In the status illustrated in FIG. 5, there is displayed in the studio setup window 400 only the information concerning the CG characters. This status will hereinafter be referred to as the CG character setup mode. In this CG character setup mode, information of the setting mode option menu 413 displayed within the studio setup window 400 is a character string reading "character setup".

In the following, GUI (Graphical User Interface) operation in the CG character setup mode will be described, only by way of example, by reference to FIG. 5 and FIG. 17.

For setting up the character "A" 607, the operator changes the values of the X-coordinate text field 402, the Z-coordinate text field 403 and the character attitude setup text field 404 all found within the CG character setup board 401 to thereby set up the disposition and the attitude (e.g. orientation) of the character "A" 607. In the exemplary case illustrated in FIG. 5, a couple of CG characters, i.e., the character "A" and the character "B", are set. In that case, if the operator or user wants to set up the character "B" 606 in addition to the character "A" 607, he or she can set or determine the position and the attitude (orientation) of the character "B" 606 by changing or altering the similar setup items appearing on the CG character setup board 421 which is found in the setup board column 411. Further, when the display can not be visually discerned because of being hidden, then the scrolling operation is performed with the aid of the slider 414 to display the concealed portion. In this way, the CG character setup procedure can be continued. FIG. 17 is a view for illustrating exemplarily and concretely a coordinate system for setting up the disposition or position and the attitude (orientation) of the CG character.

Figure 17:
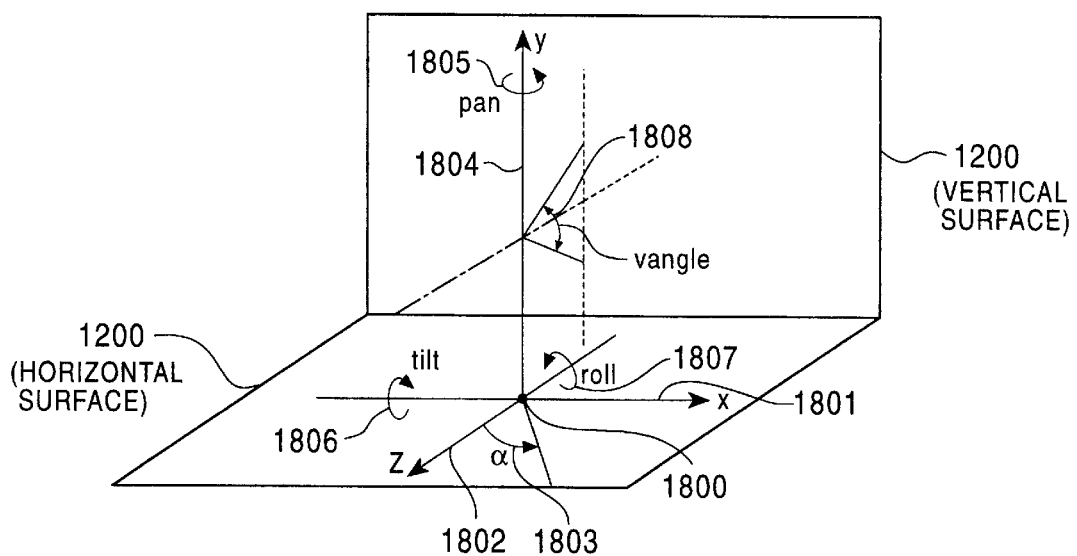
FIG. 17 is a view for illustrating, by way of example, a coordinate system internally of a CG studio which is referenced upon carrying out the video or TV program editing method according to an embodiment of the present invention.

Referring to FIG. 17, reference numeral 1200 denotes a CG studio, numeral 1800 denotes a center (X-coordinate "0", Z-coordinate "0" and Y-coordinate "0") of the CG studio 1200, numeral 1801 denotes the X-axis for indicating the positions in the horizontal direction (transverse direction) relative to the origin defined by the center 1800 mentioned above (with the section of plus direction of the X-axis being taken rightward as viewed from the operator toward the CG studio 1200), numeral 1802 denotes the Z-axis indicating the positions in the depthwise direction relative to the origin defined by the above-mentioned center (with the section of plus direction of the Z-axis being taken frontward when viewed from the operator in the direction toward the CG studio 1200), numeral 1804 denotes the Y-axis for indicating the positions in the direction heightwise of the CG studio 1200 relative to the origin defined by the aforementioned center 1800, numeral 1805 denotes a counter-clockwise rotation (pan) around the Y-axis 1804, bearing zero angle relative to the plus section of the Z-axis 1802, numeral 1803 denotes an angle (d) of the counter-clockwise rotation around the Y-axis 1804 with reference to the plus section of the Z-axis 1802 (indicating zero angle of the counterclockwise rotation around the plus section of the Y-axis 1804), numeral 1806 denotes a clockwise rotation (tilt) around the plus X-axis 1801 with reference to the minus section of the Z-axis 1802 (angle 0 rad.), numeral 1807 denotes a counterclockwise rotation (roll) around the plus section of the Z-axis 1802 with reference to the Y-axis 1804 (angle 0 rad.), and reference numeral 1808 denotes a vertical view field range angle indicating a visual angle (referred to as the vangle only for the convenience of description) as viewed in the Y-direction from a given point on the X-Z plane.

As can be seen from the above, by varying the values of the X-coordinate text field 402, the Z-coordinate text field 403 and the character attitude setup text field 404, it is possible to set the positions and the attitudes of the CG characters in both the X- and Z-axis directions, respectively.

In the case where dispositions or positions of the CG characters are to be determined by the operator or user in the CG character setup mode described previously, it is easy for him or her to see the dispositions of the CG characters by looking down from the above in the Y-axis direction. In order to realize such view point mentioned just above with the hitherto known techniques, the operator is required to dispose the camera just above the CG studio 1200 (e.g. at a center point on the ceiling) and adjust the camera angle such that the view field thereof can over the CG studio located just beneath the camera.

On the other hand, in the case where the setup of the camera work is required for the adjustment of the camera angle mentioned above, the setting mode option menu 413 shown in FIG. 5 is changed over to the mode "camera setup". To this end, the operator has to click the click button appearing at the right hand in the setup mode option menu 413 with the mouse, to thereby select "camera setup" from the items displayed in response to the mouse click, whereupon the studio setup window 400 shown in FIG. 5 is changed over to the "camera setup" mode. As a result of this, the setting mode option menu 413 is changed to the display of "camera setup" from the display of "CG character setup".

Figure 6:
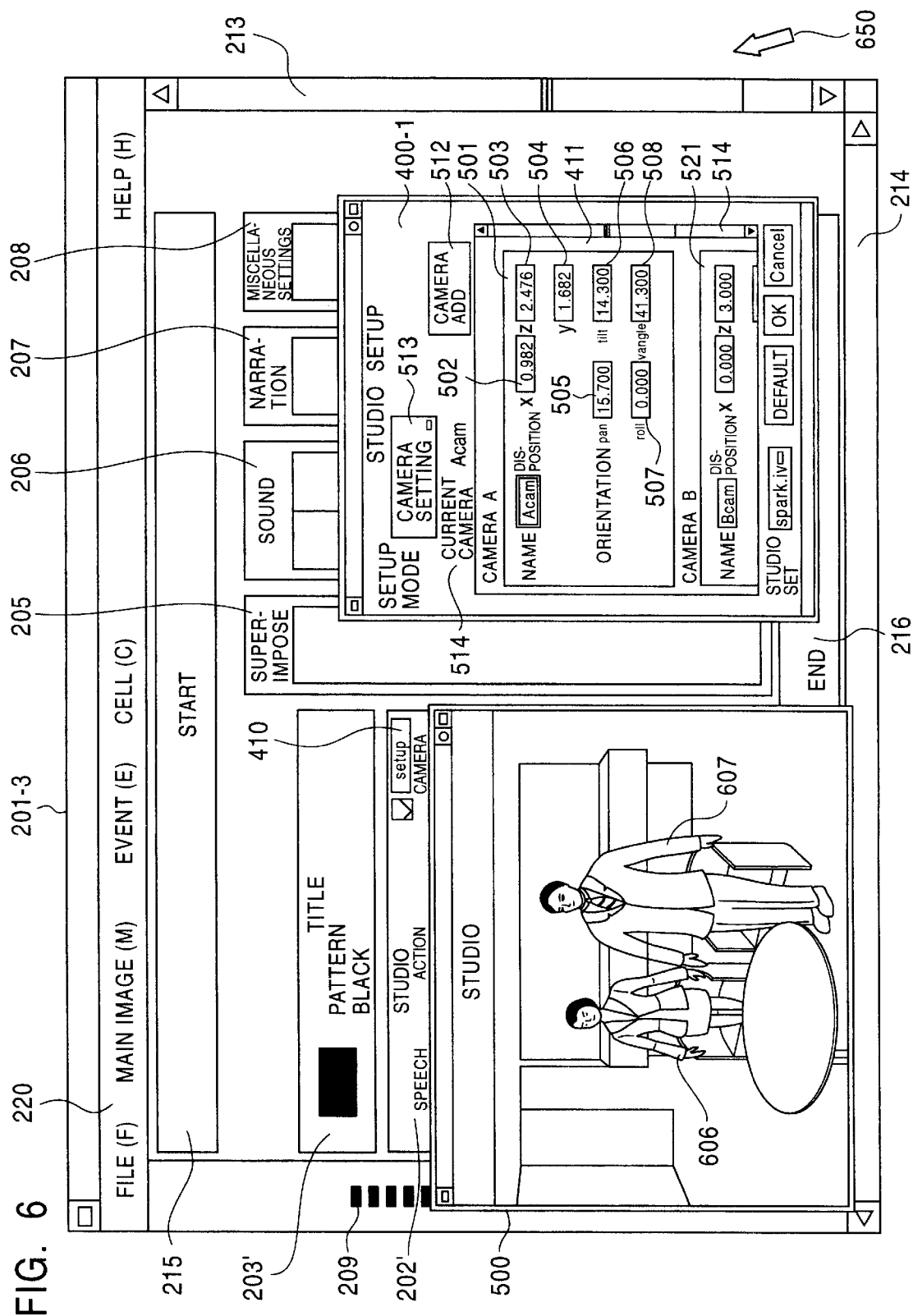
FIG. 6 is a view showing another studio setup window.

FIG. 6 is a view showing a typical example of the display screen in the case where the studio setup window is in the camera setting mode mentioned above. In the figure, components like as or equivalent to those described hereinbefore are affixed by like reference numerals. In this figure, the edit display screen is generally denoted by reference numeral 203-1. Further, in FIG. 6, numeral 400-1 denotes the studio setup window, numeral 513 denotes the setup mode option menu, numeral 511 denotes a camera setup board column, numerals 501 and 521 denote camera setup boards for setting the dispositions and others of the camera "A" and the camera "B", respectively, numeral 512 denotes a camera add button destined to be clicked with the mouse for allowing an additional camera to be entered, numeral 502 denotes an X-coordinate text field for setting the X-coordinate position of the camera "A" on the CG studio 1200, numeral 503 denotes a Z-coordinate text field for setting the Z-coordinate position of the camera "A", numeral 504 denotes a Y-coordinate text field for setting the Y-coordinate position of the camera "A", numeral 505 denotes a pan-angle text field, numeral 506 denotes a tilt-angle text field, numeral 507 denotes a roll-angle text field, numeral 508 denotes a visual angle (vangle) text field and reference numeral 514 denotes a slider manipulated for changing or altering the display position of the camera setup board column 511.

Referring to FIG. 6, displayed in the preview window 500 is an image generated when the interior of the CG studio 1200 is taken or picked up with a camera termed "Acam" employed currently. The position and the angle at which the camera "Acam" is being set within the CG studio 1200 are indicated by the values in the respective text fields 502 to 508 which are displayed as parameters serving for setting the camera "Acam" in the camera setting board 501. In the case where this camera "Acam" is to be set up at a mid position above the CG studio 1200, e.g. at a mid ceiling position, the operator is required to alter the set coordinate values seen in the individual text fields 502 to 508, respectively, of the camera setting board 501.

If the camera view point is changed for checking the positions of CG characters in the studio during the editorial work, the edited video program including the images in the changed view point is broadcasted. Such images in the changed view point are not preferable to be used in the video program, but only used for editorial work.

However, in practical applications, there will scarcely be encountered such situation in which the camera whose view point is so set that the CG studio 1200 is viewed directly overhead in the CG studio 1200. In other words, the images picked up by the camera disposed as mentioned above are scarcely used as the images for the program broadcast in practical applications. To say in another way, the operator is forced to take trouble of setting up a camera, the images from which are not used for the program but used only to acquire information concerning the disposition(s) of the CG character(s).

Similar inconvenience will be brought about equally in the case where actions or moves of the CG character(s) must be checked or reviewed or confirmed. This will be described below in conjunction with the GUI manipulation illustrated in FIG. 7, only by way of example. Incidentally, this figure shows an exemplary or typical display when speech(es) of the CG character(s) is to be set up with the aid of the studio setup window.

Figure 7:
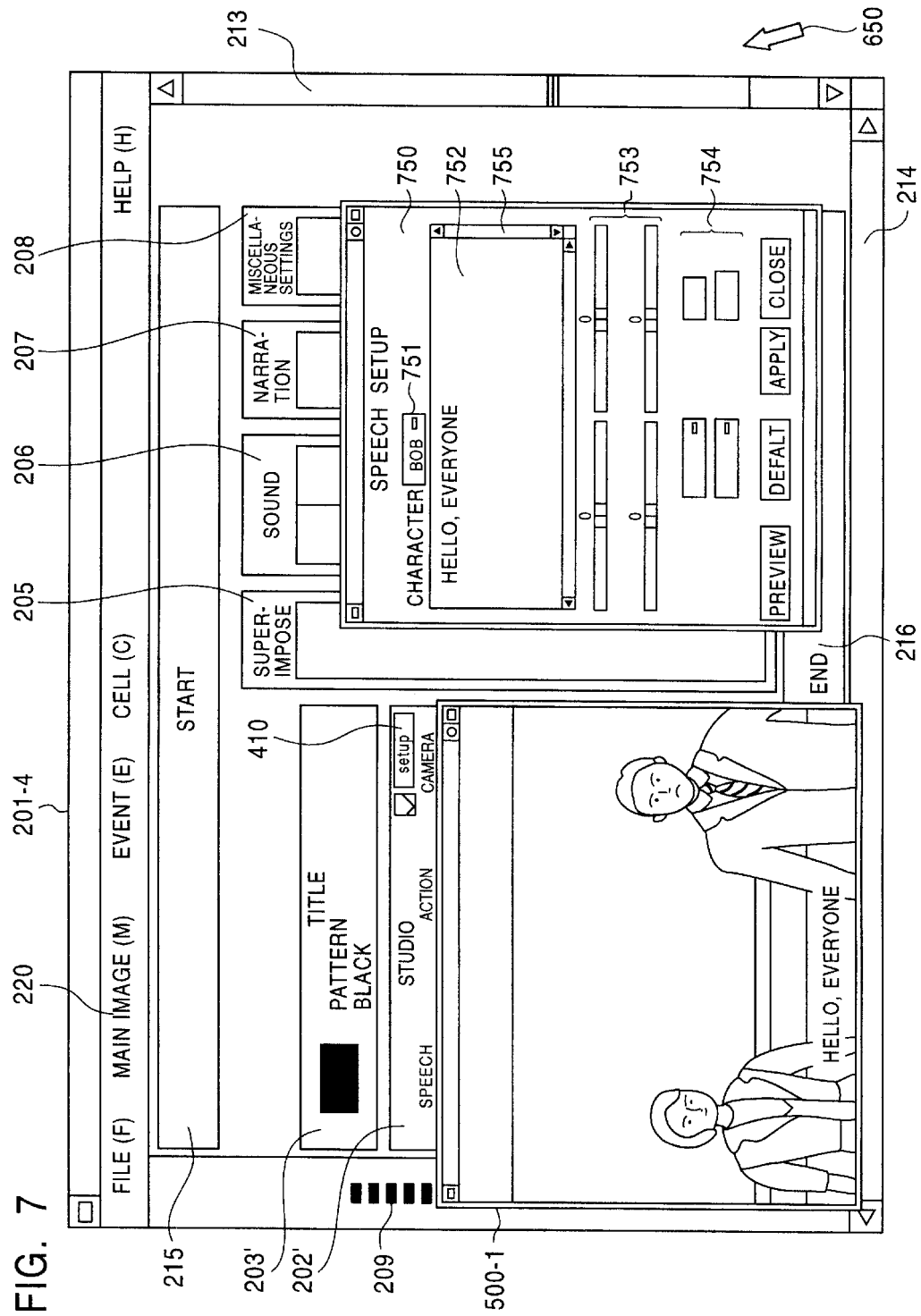
FIG. 7 is a view showing a speech setup window generated in the TVML-based TV program editing system.

In FIG. 7, components like as or equivalent to those described hereinbefore are denoted by like reference numerals. In this figure, the edit display screen image is denoted generally by reference numeral 201-4. Further, numeral 500-1 denotes a preview window, numeral 750 denotes a speech setup window, numeral 751 denotes a character menu, 752 denotes a speech setup field, 753 collectively denotes sliders, 754 collectively denotes option menus 754, and reference numeral 755 denotes a slider for sliding or moving a displayed position of the speech setup field 752.

Now, let's assume that the speech of a CG character is to be set up. In that case, the speech setup window 750 is firstly popped up for display by clicking twice with the mouse a relevant cell in the speech setting field 210 of the CG character found in the studio block 202 shown in FIG. 3. In that case, the image generated at a time point at which operation of the cell selection (i.e., double clicks) has been completed is displayed in the stationary or still state in the preview window 500-1. Incidentally, the time point at which the cell operation has been ended means the time point when the CG character has finished its speech or speaking their words.

Now, when the speech of the CG character is to be set up with the aid of the speech setup window 750 shown in FIG. 7, the character menu 751 can serve for setting the character (s) who speaks its words. This setting procedure can certainly be realized with the mouse. By way of example, in the case of the example illustrated in FIG. 7, a CG character named "BOB" is set up.

The speech setup field 752 serves for setting the contents of speech, which can be inputted with the aid of e.g. a keyboard. In the case of the example shown in FIG. 7, the speech set up is "Hello, everyone".

The sliders 753 are resorted to for setting pitch of speaking, volume (sound volume), tone quality (e.g. voices of man, woman, child or of others), intonation and the like. To this end, the mouse can be used. The option menus 754 can be used for setting up actions which the CG character performs in accompanying the speaking, displaying the contents of the speech with a caption on the preview window 500-1 and the like. To this end, the mouse can equally be used.

In conjunction with the speech setup, there may arise such situation in which the operator wants to display a CG character concerned on the preview window 500 with a magnification with a view to confirming synchronization between the movement of the CG character's mouth and the speech by viewing the computer graphics in close-up. In that case, with the conventional techniques, the operator is required to set again the camera close to the CG character by manipulating the relevant camera disposed interiorly of the CG studio 1200.

Furthermore, inconvenience similar to those elucidated above may occur in the case where the position and the attitude or orientation of the CG character have to be set at the end position of working motion of the CG character in an action setup window which aids the operator or user in setting up the action(s) or move(s) of the CG character(s). This will be described in conjunction with the GUI operation illustrated in FIG. 8 being taken as example.

Figure 8:
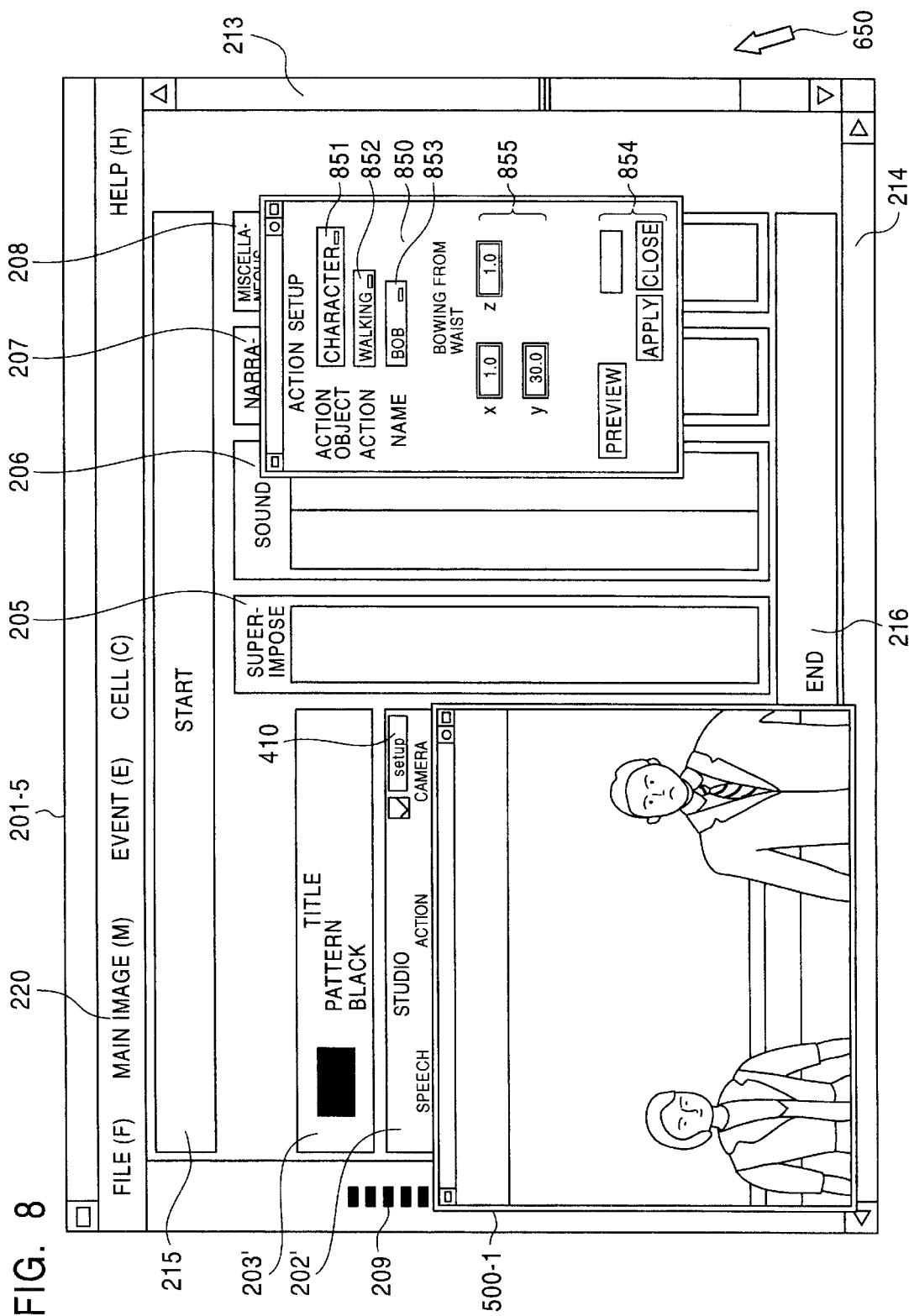
FIG. 8 is a view showing an action setup window generated in the TVML-based TV program editing system.

In FIG. 8, components and parts like as or equivalent to those described hereinbefore are denoted by like reference numerals. The action setup window is denoted generally by reference numeral 850. Furthermore provided are an action-object menu 851, an action menu 852, a character menu 853, an option menu 854, and a set of text fields 855.

When the position and the orientation of the CG character at the time point when walking thereof is terminated is to be set up with the aid of the action setup window 850 shown in FIG. 8, the action object menu 851 can serve for determining or setting up action objects (i.e., objects indicative of actions concerned). To this end, the mouse can of course be used. In the case of the example illustrated in FIG. 8, the character who performs action is set up. In addition, tools or the like fittings will have to be set up with the action setup window 850.

The action menu 852 serves for setting up the actions which are to be performed by the CG character, for which the mouse can be used. In the case of the example illustrated in FIG. 8, it is presumed that "walking" is set up in the action menu 852. However, other actions can of course be set. As the examples of such other actions, there may be mentioned "bow", "tremble", "open mouth wide" and the like.

The character menu 853 can serve for setting up the CG character who is scheduled to perform actions. Of course, the mouse is used to this end. In the exemplary case illustrated in FIG. 8, it is presumed that the CG character named "BOB" is set up.

The text fields 855 serve for setting up the position(s) where the CG character(s) will have finished walking and the attitude thereof. The relevant coordinate systems are similar to those indicated by the parameters 402 to 404 of the CG character setup board 401 in the studio setup window 400 illustrated in FIG. 5.

The option menu 854 serves for setting up degree(s), extent(s) and attributes of the action(s). By way of example, in conjunction with the action "bow", such attributes as "making a bow from the waist", "bowing slightly" and so forth may be set up. To this end, the mouse can be used, needless to say.

Furthermore, in the operation in the mode described above, there may arise such situation that the operator wants to have the CG character to walk to a location outside of the range or frame of the preview window 500-1. In that case, when the image being currently displayed in the preview window 500-1 is an image picked up, for example, by the camera "Acam" disposed internally of the CG studio 1200, the operator is required to dispose another camera of the view point differing from that of the camera "Acam" in the CG studio 1200 in order to set the walk end position and the walking direction for the CG character.

In the following, description will be directed to the conveniences which arise when the cameras having the mutually different view points, respectively, are changed from one to another in the course of editing the video program described above. Now, let's assume such situation in which the image picked up by the camera "Acam" is being displayed in the preview window 500-1 and that editing work for setting up motions, performance or actions of a character "A" appearing in the image is to be carried out. In that case, when the range over which the character "A" is caused to move exceeds the image pickup range of the camera "Acam" for the video program to be produced, it becomes necessary to install another camera "Bcam" having the pickup range which can cover the range over which the character "A" is caused to move is installed. Further, the data designating the action range of the character "A" has to be set in the action setup window 850 while visually observing the image being picked up by the camera "Bcam".

To this end, operation for closing the action setup window 850 being currently opened has to be firstly performed on the screen display shown in FIG. 8. Subsequently, the setup button 410 shown in FIG. 3 has to be clicked with the mouse 650 to thereby open the studio setup window 400 such as illustrated in FIG. 5. When the studio setup window 400 is popped up for display in this way, then the screen image status will be such as illustrated in FIG. 5. At this time point, the images taken through the camera "Acam" remain visibly in the preview window 500. In succession, manipulation for changing over the setup mode to "camera setting" from "character setup" is performed with the aid of the mouse 650. When the studio setup window 400 has thus been changed to the camera setting mode, the screen display status will then be such as illustrated in FIG. 6. At this time point, the images taken through the camera "Acam" still remain visibly in the preview window 500.

In succession, when a given one of the text fields appearing in the camera setting board 521 is clicked with the mouse 650, the camera is changed over to the other camera "Bcam" from the camera "Acam", whereby the images taken by the camera "Bcam" is displayed in the preview widow 500. The pickup range of the camera "Bcam" is set in advance so that the motion or action of the character on the studio can be grasped.

Subsequently, when the studio setup window 400 is so manipulated as to be closed, the display assumes such status that the preview window 500 is displayed on the screen image shown in FIG. 3. In succession, the action setup window 850 is displayed. Thus, the screen display assumes such status as illustrated in FIG. 8. Thus, the operator can input the values set for the action of the character "A" while confirming the range of action thereof by viewing the image taken by the camera "Bcam" and displayed within the preview window 500-1.

As can be appreciated from the foregoing, there are involved lots of manipulation steps and change-overs of the screen displays for changing over the camera from the camera "Acam" to the camera "Bcam" in order to set up the actions or motions of the character, incurring remarkable time consumption and troublesome procedure in the editing work.

At this juncture, it is also noted that another method is conceivable according to which a camera setting window (not shown) is displayed after closing of the action setup window 850 in the status where the image taken by the camera "Acam" is being displayed within the preview window 500-1 and then the camera "Acam" is changed over to the other camera "Bcam". However, with this method, the editing work will become more complicated and troublesome because the action setup window 850 can be popped up while displaying the image originating in the camera "Bcam" only through a greater number of screen display changing manipulations and steps when compared with the method described above.

Thus, it can now be understood that if the manipulations involved in changing over the camera from one to another of different view point can be realized with a single screen display through simplified procedure while avoiding the inconveniences mentioned previously, the burden imposed on the operator or editor (or user) can significantly be mitigated with the efficiency of the editing work being remarkably enhanced.

As will now be obvious with the program edition methods described hereinbefore by reference to FIGS. 3 to 8, check or confirmation as to the objects within the CG studio (CG characters and CG fittings) as well as actions of the CG characters makes it necessary not only to change or alter the camera setting valid for the currently edited images but also to set the confirmation-dedicated camera by the operator himself or herself, involving much complicated procedure to great disadvantages.

With the present invention, it is contemplated to provide a method which can avoid the disadvantages described above and which can thus facilitate the procedure or works involved in disposition of the CG objects such as CG characters, CG tools, CG fittings and the like internally of the CG studio, confirmation of the actions or motions of the CG character(s) and the like.

In view of the above and other objects which will become apparent as the description proceeds, it is contemplated with the present invention to provide a video program editing which can much facilitate the work or procedure for checking or confirming the disposition of the object(s) within the CG studio, action of the CG character(s) and others by providing a proper view point or points dedicated for acquiring information about the disposition of the objects and action of the CG character(s) in the CG studio. Parenthetically, the proper view point or points will be referred to as the user's view point(s), and the camera corresponding to the user's view point(s) will be referred to as the user's view point camera(s) for discrimination from the set camera mentioned hereinbefore.

Now, an embodiment of the present invention will be described by reference to FIG. 1 which is a view showing an edit screen display for illustrating the television program editing method according to the instant embodiment of the invention.

In the figure, components like as or equivalent to those described hereinbefore are denoted by like reference numerals. The edit screen display is generally denoted by reference numeral 201-6. Further, the preview window is denoted by numeral 600, a preview display is denoted by numeral 601, an option menu for the view point (hereinafter referred to as the view point menu) is denoted by numeral 602, an option menu for position of the user's view points (hereinafter referred to as the position menu) is denoted by numeral 603, an option menu for projection method conversion (hereinafter referred to as the projection method conversion menu) is denoted by numeral 604, and a user's view point adjust button (hereinafter referred to as the view point adjust button) is denoted by reference numeral 605. Functions of these components will be described below.

In the first place, description will be made of the view point menu 602 and the position menu 603 by taking as an example the case of setting up the positions of the CG characters within the CG studio 1200 as shown in FIG. 1. The studio setup window 400 shown in FIG. 1 is popped up for display in a similar manner as described hereinbefore by reference to FIG. 5. In the preview display 601 making appearance within the preview window 600, there is displayed the image of the CG studio 1200 which is taken by a camera set in the camera setting mode selected from the studio setup window 400-1 shown in FIG. 6. The fact that the image making appearance in the preview display 601 is the one taken by the set camera mentioned above is indicated by "camera view point" appearing in the view point menu 602.

In the case of the example shown in FIG. 1, the image or picture taken by the camera which is disposed generally at the right side to the CG studio is generated in the preview display 601 as the image determined by the view point of the set camera. On this condition, let's suppose, by way of example only, that the operator wants to adjust the dispositions of the character "B" 606 (named "MARY") and the character "A" 607 (named "BOB") as viewed from the front side of the CG studio 1200. This can be accomplished by adjusting the positions of the CG characters in the X-axis direction of the studio.

In this conjunction, it is important to note that adjustment of the disposition(s) of the CG character(s) is not carried out after the position of the camera has been shifted to the front side of the CG studio by the operator but can be performed by making use of the view point data previously set in the editing apparatus. The view point of this sort is herein referred to as the user's view point.

Figure 11:
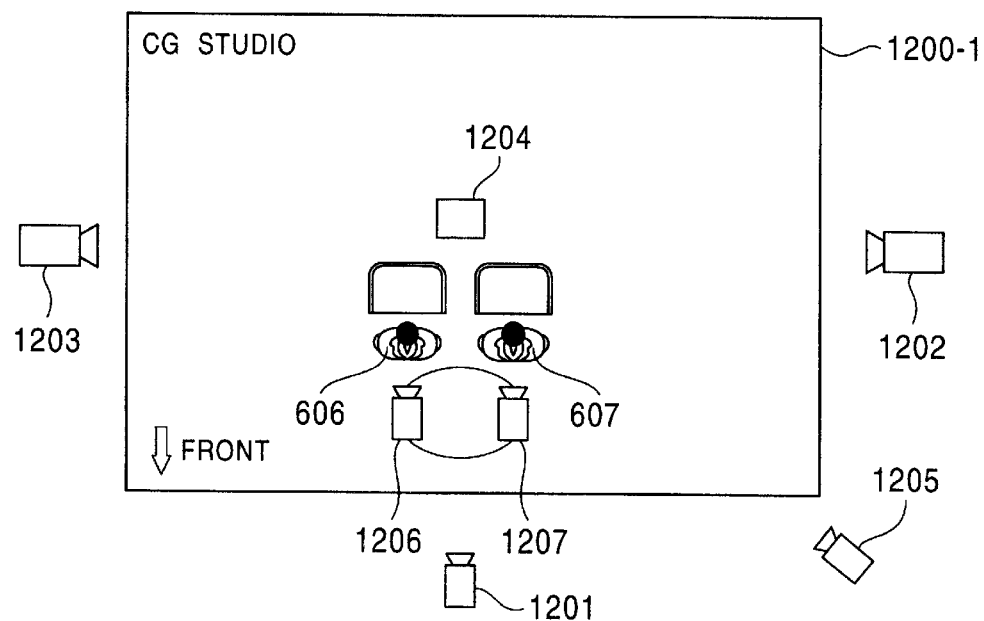
FIG. 11 is a view showing disposition of cameras of user's view point according to an embodiment of the present invention.
Figure 12:
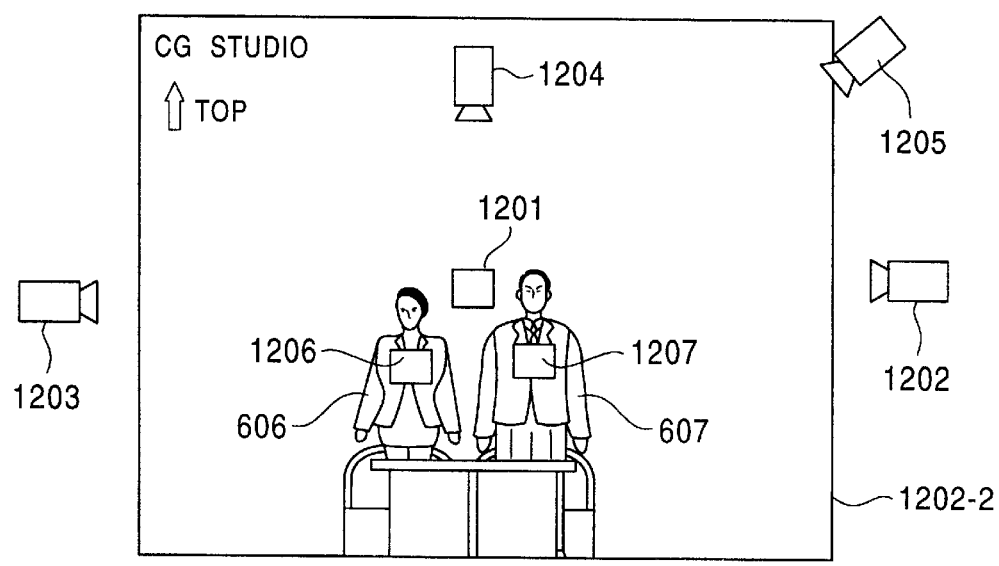
FIG. 12 is a view showing another disposition of user's view point cameras according to an embodiment of the present invention.

Position of the user's view point is illustrated in FIG. 11 and FIG. 12, by way of example only. More specifically, FIG. 11 is a view for illustrating the position of the user's view point, as viewed from above the CG studio, and FIG. 12 is a view for illustrating the position of the user's view point, as viewed from the front side of the CG studio. In the figures, components like as or equivalent to those described hereinbefore are affixed by like reference numerals. In addition, reference numeral 1200-1 denotes the CG studio viewed from the front side and reference numerals 1202 to 1207 denote user's view point cameras, respectively. More specifically, looking in the direction toward the CG studio 1200-1 or 1200-2, the camera (front camera) 1201 is disposed or set up at the front, the camera (right-hand camera) 1202 being set up just at the right side, the camera (left-hand camera) 1203 being set up just at the left side, the camera (top camera) 1204 being set up just above, the camera (upper-right camera) 1205 being set up at an upper right corner, the camera (character-facing camera) 1206 being set up in front of the CG character 606, and the camera (character-facing camera) 1207 being set up in front of the CG character 607.

Figure 15:
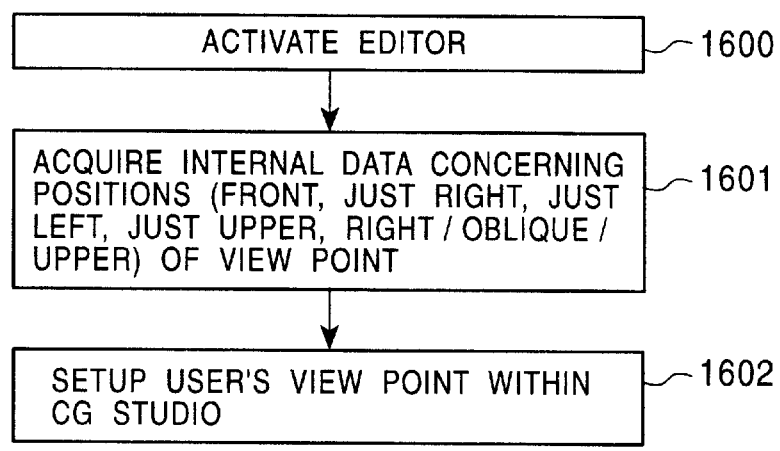
FIG. 15 is a flow chart for illustrating a user's view point setup method according to an embodiment of the present invention.
Figure 16:
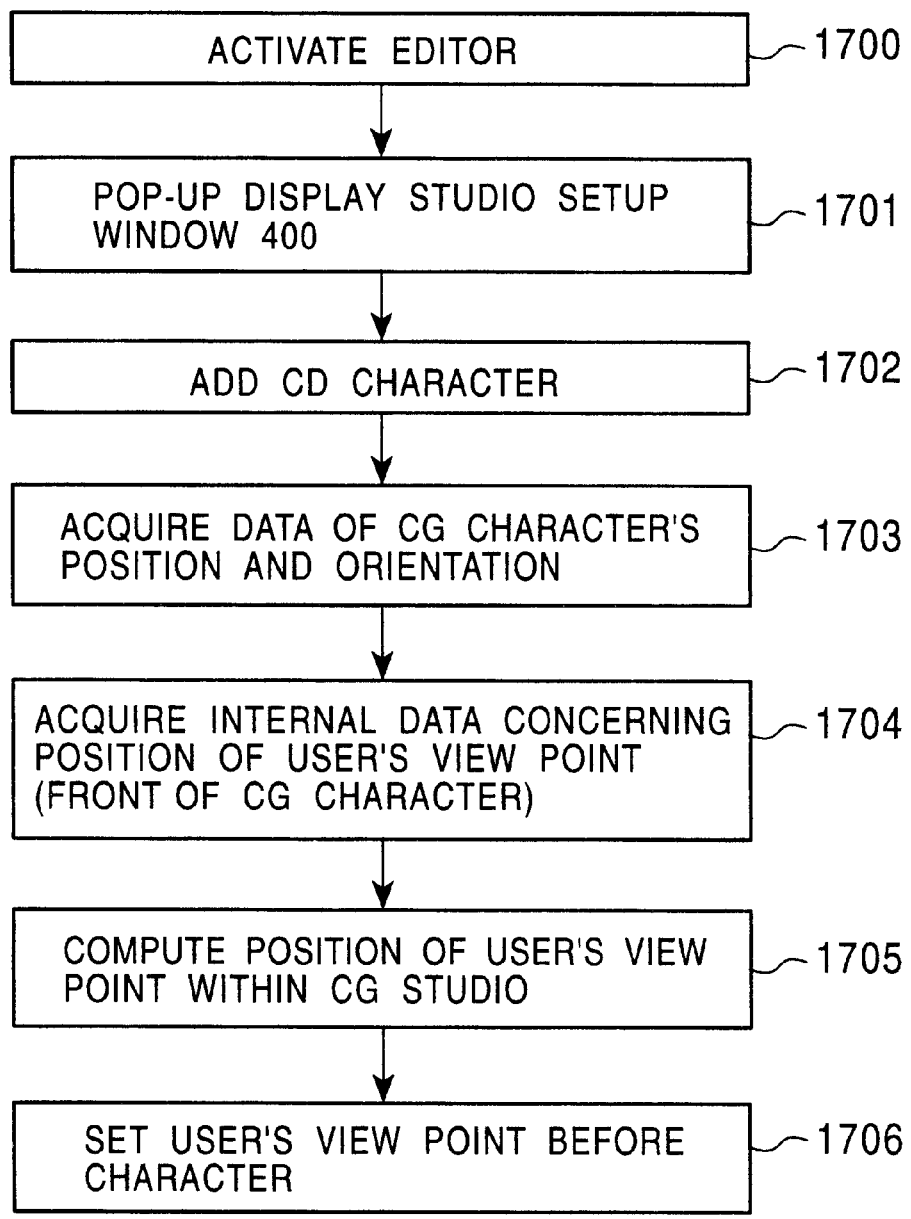
FIG. 16 is a flow chart for illustrating another user's view point setup method according to an embodiment of the present invention.

There are two methods of setting up the user's view point, as shown in FIGS. 15 and 16, respectively.

More specifically, FIG. 15 is a flow chart for illustrating a method of setting up five user's view point cameras, i.e., the front camera 1201, the right-hand camera 1202, the left-hand camera 1203, the top camera 1204 and the upper-right camera 1205 illustrated in FIG. 11.

Referring to FIG. 15, the operator firstly activates the editing apparatus in a step 1600. Then, the information image of the edit screen display 201 shown in FIG. 3 is generated on the monitor 108 shown in FIG. 2.

In a step 1601, data concerning the positions of the user's view point camera (i.e., front, right-hand, left-hand, top and upper-right camera, respectively) are automatically acquired or fetched from the storage 106. Parenthetically, these position data represent the values in the coordinate system shown in FIG. 17. In the magnetic storage 106, the position data concerning the user's view point cameras are stored previously.

In a step 1602, the user's view point cameras (1201 to 1205) are automatically set up at the predetermined positions, respectively, internally of the CG studio on the basis of the position data mentioned above.

FIG. 16 is a flow chart for illustrating the method of setting the two user's view point cameras 1206 and 1207 which are to be set up at the front of two CG characters, respectively. These two user's view point cameras can be moved in accompanying to the actions or moves of the CG characters.

Referring to FIG. 16, in a step 1700, the operator firstly activates the editing apparatus. Then, the screen image of the edit display screen 201 shown in FIG. 3 is generated on the monitor 108 shown in FIG. 2.

In succession, in a step 1701, the setup button 410 shown in FIG. 5 is clicked with the mouse to thereby pop up for display the studio setup window 400 also shown in FIG. 5.

Further, in a step 1702, by clicking the character add button 412 with the mouse, a CG character is added within the CG studio. The phrase "add character" means to set up (or dispose) a CG character on the CG studio.

In a step 1703, data concerning the position and the attitude or orientation of the CG character is automatically acquired. The data concerning the CG character is set in the studio setup window 400 shown in FIG. 1.

On the other hand, the internal data concerning the positions of the user's view point cameras (which are disposed at the front of two CG characters) are automatically acquired from the storage 106 in a step 1704.

Figure 18:
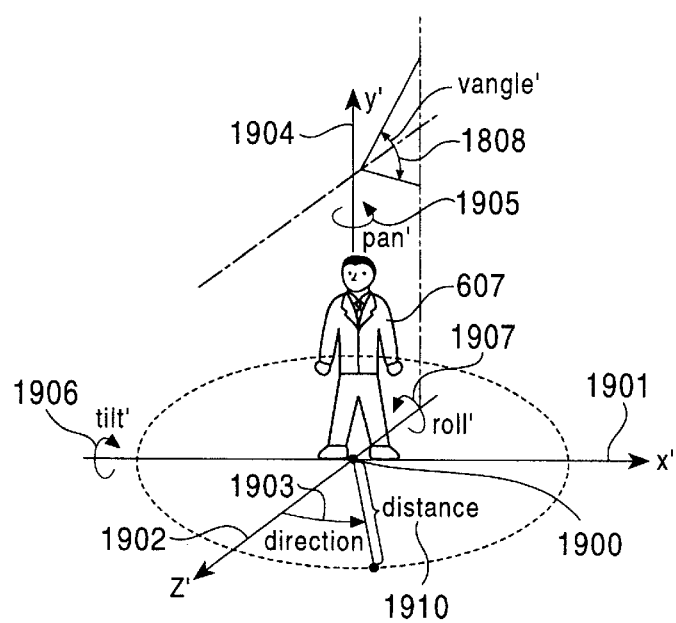
FIG. 18 is a view for illustrating a method of setting position data concerning position of a user's view point according to an embodiment of the present invention.

FIG. 18 is a diagram for explaining position data for setting user view points in the flowchart in FIG. 16. The components like as or equivalent to those described hereinbefore are designated by like reference numerals. In other respects, 1900 denotes the center of the character A 607 in the coordinate system wherein the position of the character A on the X'-Z' plane is the origin (X'=0, Y'=0, Z'=0), and 1901 denotes the X'-axis perpendicular to the forward direction of the character A 607, where the position of the character A 607 on the X'-Z' plane is set as the center (origin) of the X'-axis. Reference numeral 1902 denotes the Z'-axis parallel with the forward direction of the character A 607, where the position of the character A 607 on the X'-Z' plane is set as the center (origin) of the Z'-axis, and 1904 denotes the Y'-axis that determines the position of a height direction parallel with the Y-axis, where the position of the character A 607 on the X'-Z' plane is set as the center of the Y'-axis. Reference numeral 1903 is one of parameters concerning the line of sight and denotes an angle by right-handed (clockwise) rotation about the Y'-axis 1904 as seen to the positive direction of the Y'-axis, 1910 denotes the distance from the center of the character A 607, 1905 denotes a pan-angle, formed from the negative direction of the Z'-axis set as the angle zero, by clockwise rotation about the Y'-axis 1904 as seen to the positive direction of the Y'-axis. Reference numeral 1906 denotes a tilt-angle, formed from the negative direction of the Z'-axis 1902 set as angle zero, by a counterclockwise (left-handed) rotation about the X'-axis 1901 as seen to the positive direction of the X'-axis, and 1907 denotes a roll-angle, formed from the positive direction of the Y'-axis 1904 set as angle zero, by rotating clockwise rotation about the Z'-axis 1902 as seen to the positive direction of the Z'-axis.

As has been described, this position data is of the cylindrical coordinate system formed with the center 1900 of the character A 607 in FIG. 18 as the origin and the forward direction of the character A 607 is the zero point for angles in the circumferential direction of an imaginary circle about the character A 607.

Let us go back to the description of FIG. 16. In a step 1705, by adding the position data of user view points regarding the CG character obtained at the step 1704 to the position of the CG character in the CG studio obtained at the step 1703, the final positions of user view points, that is, the positions in terms of CG studio coordinates are calculated.

Accordingly, in a step 1706, user view points (user view point camera 1207 in this example) are set automatically at specified positions in front of the CG character. In this case, when the CG character 607 moves, the camera 1207 moves too while maintaining relative relation with the CG character.

Figure 9:
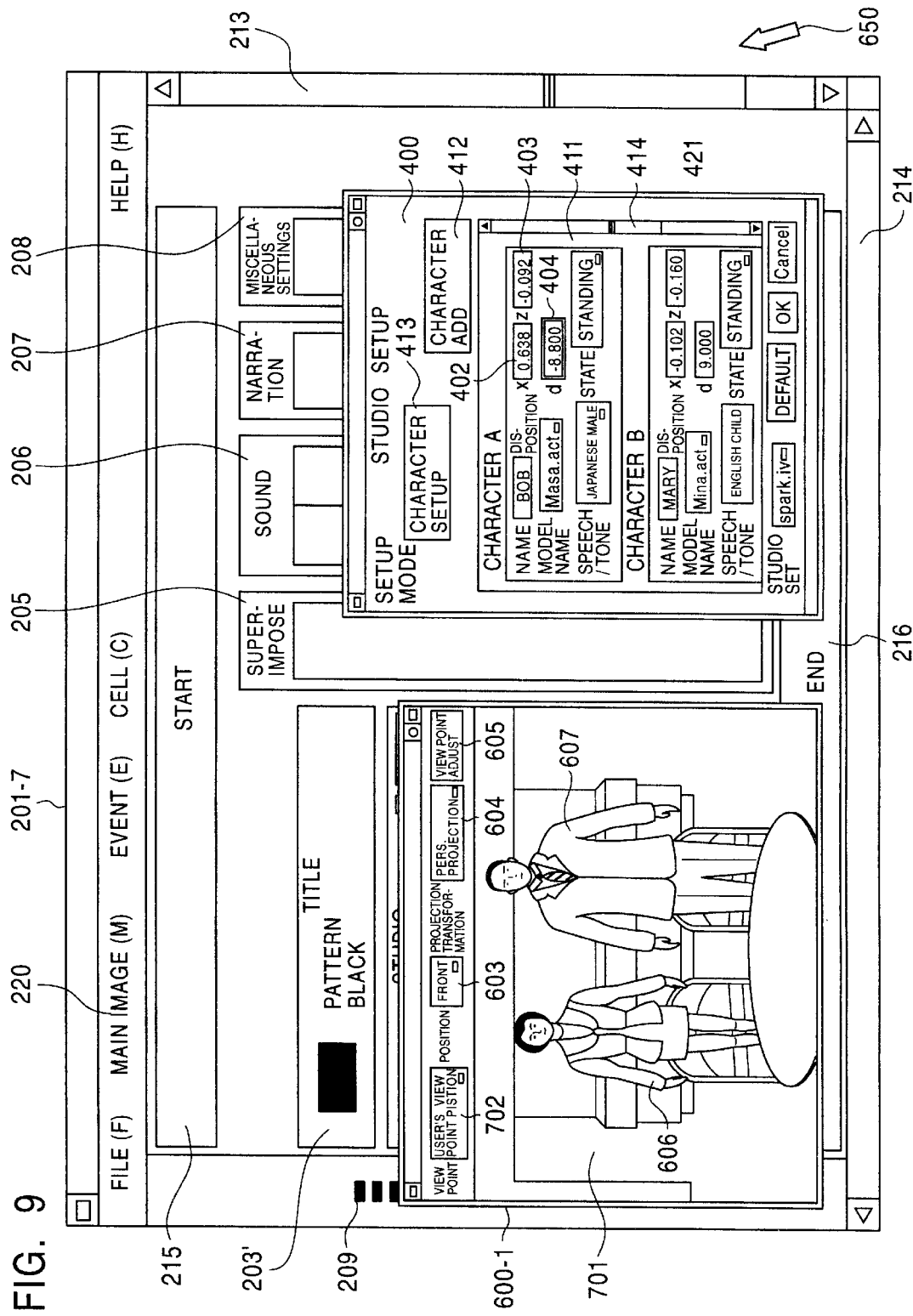
FIG. 9 is a view showing an edit display screen image generated in carrying out the video or TV program editing method according to an embodiment of the present invention.
Figure 10A:
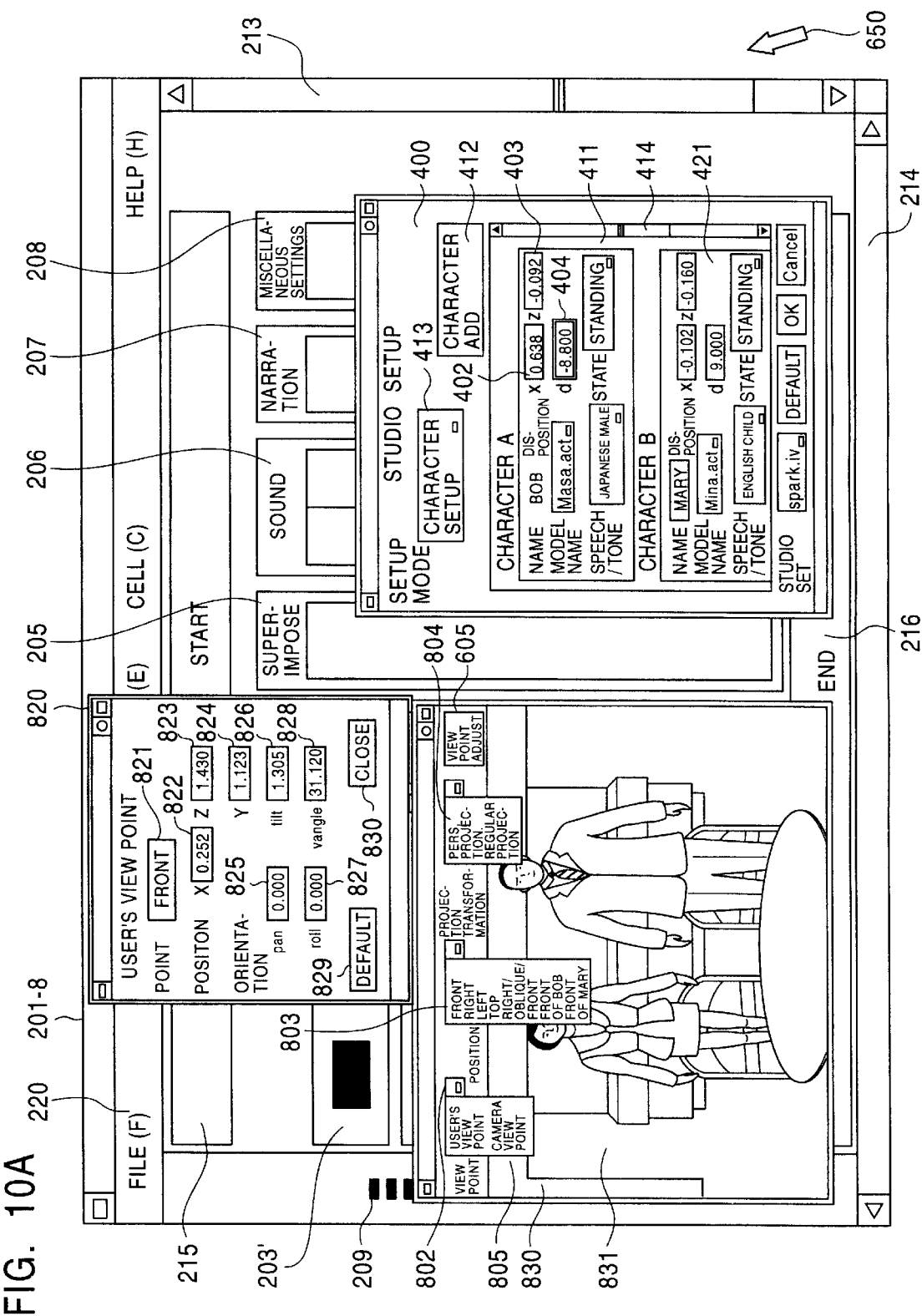
FIG. 10A is a view showing an edit display screen image generated in carrying out the video or TV program editing method according to an embodiment of the present invention.
Figure 19:
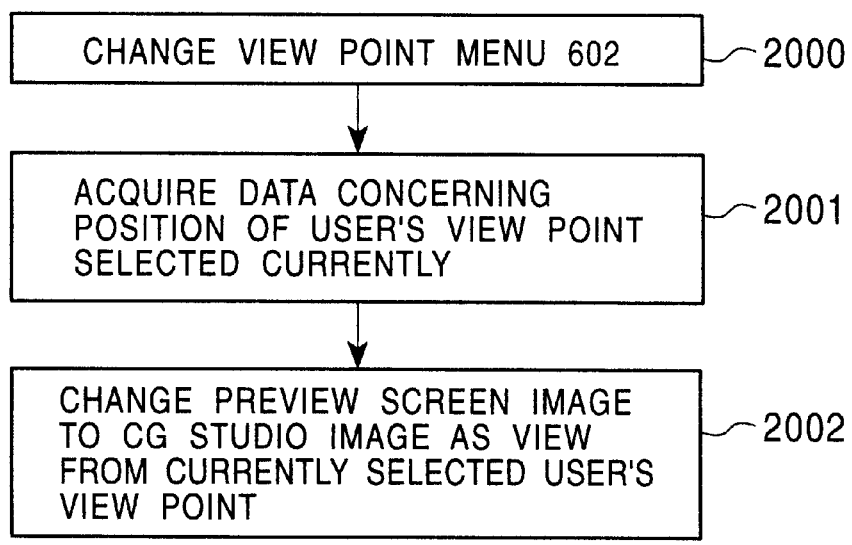
FIG. 19 is a flow chart for illustrating a processing procedure for changing over a camera view point to a user's view point according to an embodiment of the present invention.

When adjusting the arrangement of the CG character using user view points, it is necessary to change over the view point in looking at the CG studio from a camera view point to a user's view point. One example of the operation method will be described with reference to FIGS. 1 to 11 and 19. FIGS. 9 and 10A show an embodiment of user view point screen display. The studio setup window 400 shown in FIGS. 9 and 10A is a pop-up window that appears by the same operation as that in FIG. 5. FIG. 19 is a flowchart for explaining an embodiment of the change-over operation to change the preview image from a camera view point to a user's view point. In FIGS. 9 and 10A, the components identical with those described heretofore are designated with like reference numerals. Referring to other components, 201-7 and 201-8 denote an edit display screen, 600-1 denotes a preview window, 701 denotes a preview display screen, 702 and 802 denote view point menus, 803 denotes a position menu, 804 denotes a projection conversion menu, 805 denotes a user's view point menu shown in the view point menu 802, 803 denotes a preview window, 830 denotes a preview screen, 820 denotes a user's view point adjust window, 821 denotes a user's view point position display column, 822 denotes an X-coordinate text field, 824 denotes a Y-coordinate text field, 823 denotes a Z-coordinate text field, 825 denotes a pan-angle text field, 826 denotes a tilt-angle text field, 827 denotes a roll-angle text field, 828 denotes a visual angle text field, and 829 denotes a default button for bringing back the position and angle of the adjusted user view point to stored values. Note that the sub-windows 803, 804, 805 and 820 are illustrated on the same screen for explanation; however, in fact, all of them are not displayed at the same time.

In a step 2000 in FIG. 19, the operator uses the mouse to select the view point menu 602 in FIG. 1 and changes over from the Camera View Point to the User View Point. Description will be given of an actual operation of menu changeover. When the view point menu 602 is clicked with the mouse, the view point menu appears as shown at 802 in FIG. 10A. If the user view point 805 is selected, the view point menu 702 appears as shown at 702 in FIG. 9.

In a step 2001 subsequent to a step 2000, internal position data of the user's view point currently selected is acquired. In the case shown in FIG. 9, the user's view point currently selected is the user's view point "Front" (by the user view point camera 1201) as clearly shown in the position menu 603.

In a step 2002 that follows, the preview image is changed over to the CG studio viewed from the user's view point "Front" as shown in the preview image 701 in FIG. 9.

Consequently, it is possible for the operator to more accurately adjust the position of the characters 606 and 607 by using images taken from the user's view point, displayed on the preview image 701.

It ought to be noted that to bring the user's view point back to the camera view point, it is only necessary to change the view point menu 602 to "Camera View Point", by which the preview image is switched to the CG studio viewed from the camera view point in FIG. 1.

The user's view point is not limited to the front described above, but may be set at a plurality of positions in the CG studio. When one wishes to look at the inside of the CG studio from the user's view point different from the front, the operator has only to switch over the positions in the position menu 603. For example, let us discuss a case where the user's view point is changed from the front to the mid point on the ceiling of the CG studio (a position overhead). This change-over operation is performed, for example, to accurately grasp or adjust the position of a CG character in the horizontal (X) direction and in the depth (Z) direction. An example of this operating method will be described with reference to FIGS. 10A, 10B, 12, and 19 to 21. FIG. 21 is a view showing, by way of example, a preview window in the case where the CG studio is viewed from the user's view point at the middle position on the ceiling of the CG studio. FIG. 21 is a flowchart for explaining an embodiment of the action for changing from a camera view point to the user's view point. In FIG. 21, components like or equivalent to those described above are designated by like reference numerals, excepting that 201-9 denotes the edit display screen, 600-4 denotes the preview window, 2201 denotes the preview display screen, and 2203 denotes the position menu.

The studio setup window 400 in FIG. 21 is a pop-up window displayed by the same procedure as that in FIG. 5.

Figure 20:
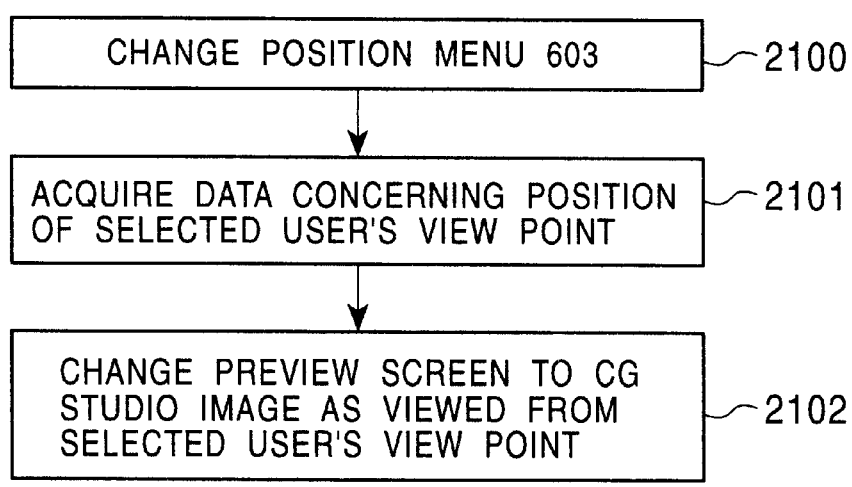
FIG. 20 is a flow chart illustrating another processing procedure for changing over a camera view point to a user's view point according to another embodiment of the present invention.

In a step 2100 in FIG. 20, the operator selects the position menu 603 in FIG. 1, and changes the position from "Front" to "Overhead". A description will made of an actual menu change-over operation. When the position menu 603 is clicked with the mouse, the position menu will appear as shown in the position menu 803 in FIG. 10A. When the overhead 840 is selected, the position menu 2203 appears as shown in FIG. 21.

In a step 2101 following the step 2100, position data of the selected user's view point overhead (user's view point camera 1204 in FIG. 12) is obtained from the storage 106.

Subsequently, in a step 2102, the view point is switched to the user's view point from overhead as shown in the preview image 2201 in FIG. 21.

As a result, the operator can accurately adjust the position of the CG characters 606 and 607 by using images taken from the user's view point as displayed on the preview image 2201.

When the user's view points have been set to front view (user's view point camera 1201), right side-view (user's view point camera 1202), left side-view (user's view point camera 1203) and overhead (user's view point camera 1204), each time the position menu 603 is switched over, one of the three views of the CG studio can be obtained, and this setup of user's view points makes it possible to accurately grasp the arrangement of the CG characters and so on in the CG studio. Even if a CG character goes out of the fields of view of the cameras in the CG studio, the position of the character can be seen from the user's view points.

If a user's view point has been set to diagonally to the front right (user's view point camera 1205), it becomes easier to recognize a three-dimensional arrangement of CG characters and so on in the CG studio.

As has been described, by using those user's view points, it is possible to grasp the entire arrangement in the CG studio from different angles.

During the TV program editing work, the operator may want to take a look at detail of the images, for example, he or she wants to have a close look at the motion of the characters at a short distance. This is why user's view point cameras 1206 and 1207 accompanying the characters are provided. This embodiment will be described with reference to FIG. 13.

Figure 13:
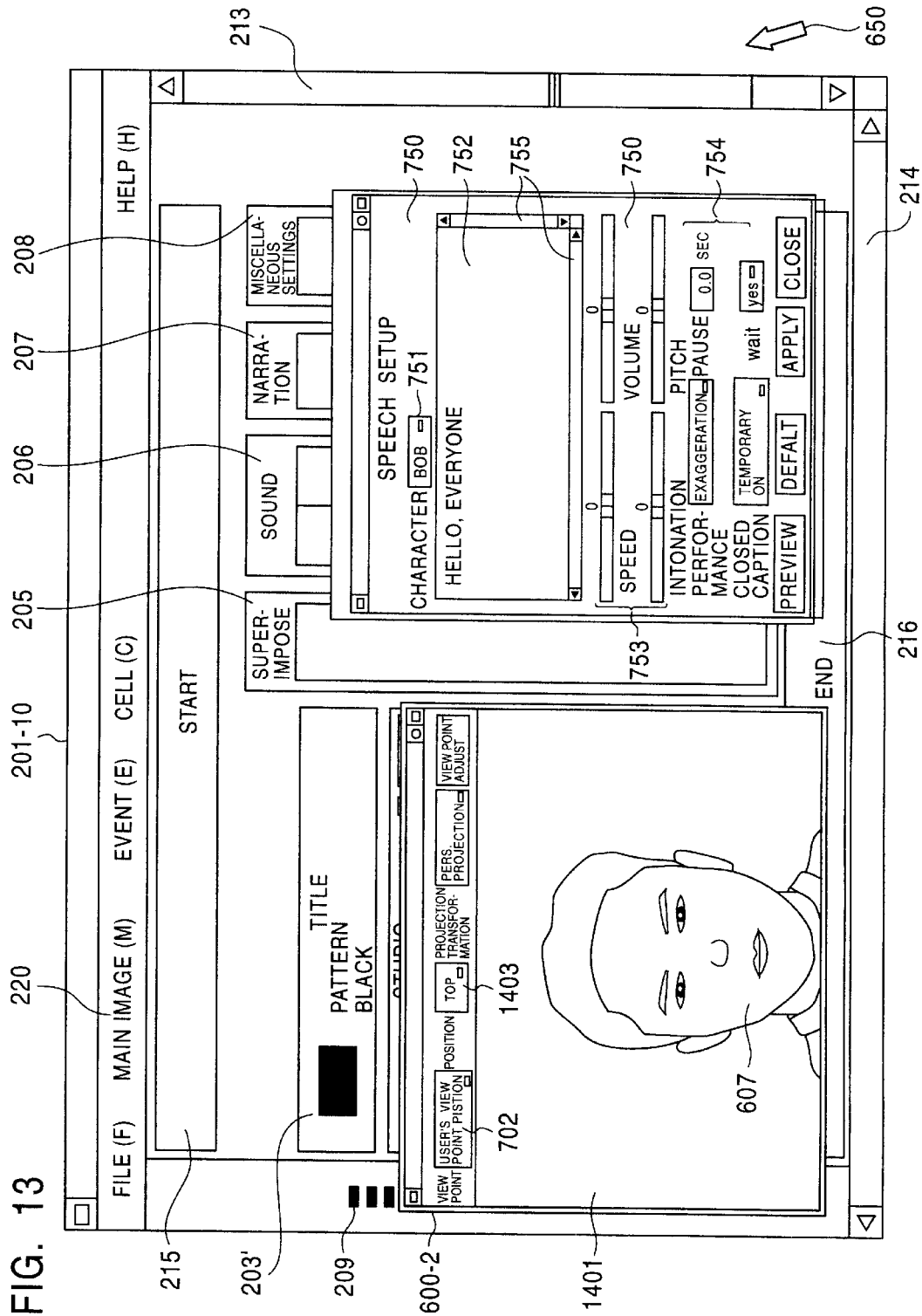
FIG. 13 is a view showing an edit display screen image for illustrating a method of setting up a user's view point camera according to an embodiment of the present invention.

FIG. 13 shows a screen image for explaining an embodiment of a method for setting a user's view point to set up speech by a CG character using a speech setup window according to the present invention. In FIG. 13, components like or equivalent to those described above are designated by like reference numerals, excepting that 201-10 denotes the edit display screen, 600-2 denotes the preview window, 140 denotes the preview display screen and 1403 denotes the position menu.

When setting speech for the character A 607 (BOB) from the speech setup window 750 as shown in FIG. 13, the operator feels it necessary to check at a short distance the mouth motion of the character A as the character A 607 speaks his part. At this time, the operator executes the processes in FIGS. 19 and 20, and as shown in FIG. 13, selects "User's View Point" on the view point menu 702 by using the mouse, and sets the position menu 1403 to "In Front of BOB". By carrying out those operations, the user's view point is switched to the position of the user's view point camera 1207. Note that the speech setup window 750 in FIG. 13 is a pop-up window displayed by the same method as in FIG. 17. Therefore, the image of the character A 607 taken from the user's view point (camera 1207) appears on the preview. By this image of the user's view point, the operator can check the mouth movement of the character A 607 as he speaks his part.

Figure 14:
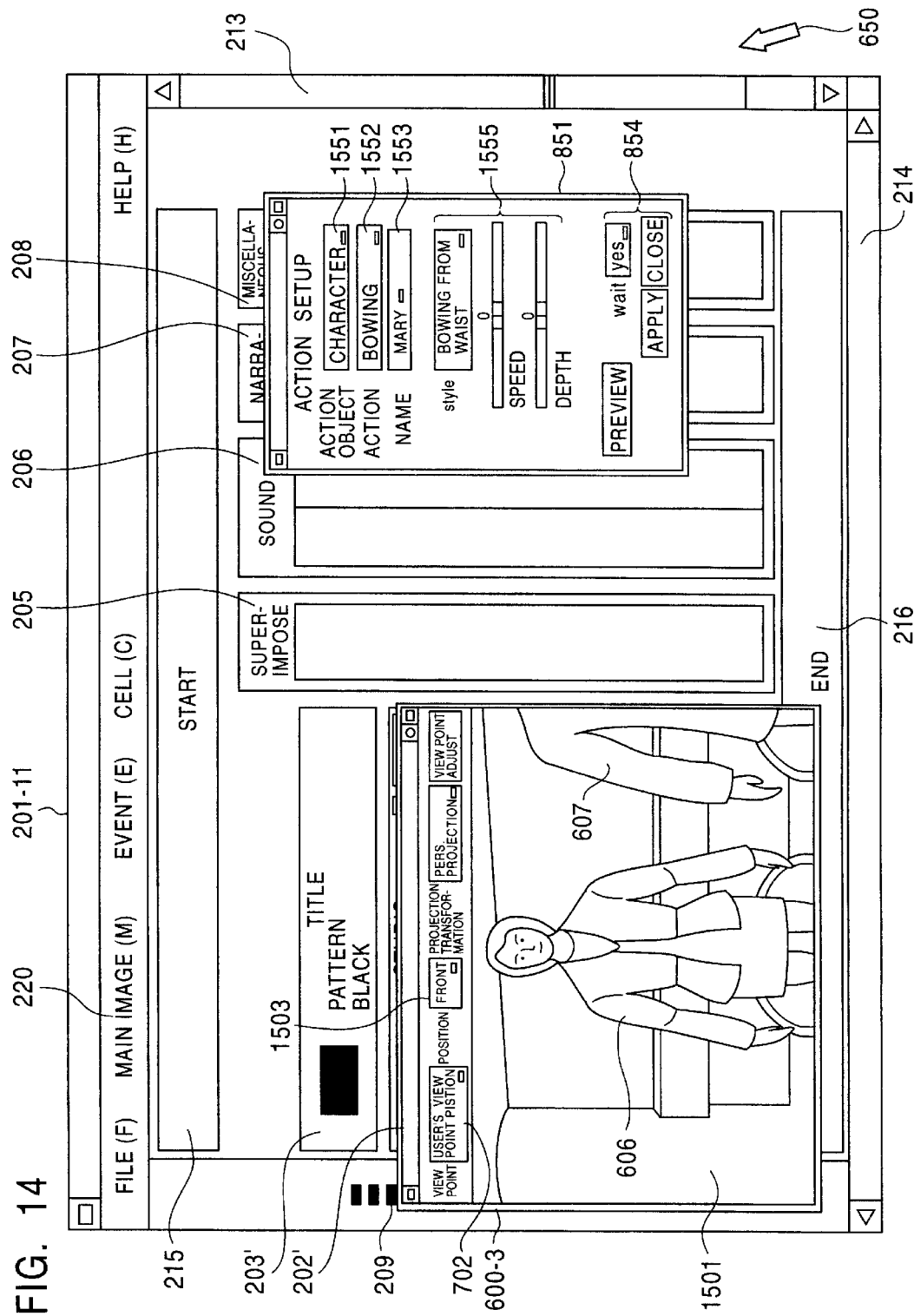
FIG. 14 is a view showing another edit display screen image for illustrating a method of setting up another user's view point camera according to an embodiment of the present invention.

FIG. 14 shows another embodiment of the edit display screen image, which includes "Bow" that the character makes. FIG. 14 is a display screen for explaining an embodiment of a method of setting up another user's view point camera to input the character's motion from the action setup window according to the present invention. In FIG. 14, components like or equivalent to those described above are designated by like reference numerals, excepting that 201-11 denotes the edit display screen, 600-3 denotes the preview window, 1501 denotes the preview display screen, 1503 denotes the position menu, 1551 denotes the action-object menu, 1552 denotes action menu, 1553 denotes the character menu, and 1555 denotes sliders and so on.

When setting the action of the CG character B 606 (MARY) on the action setup window 850 as shown in FIG. 14, the operator may sometimes want to check the action of CG characters, such as one 606 at a short distance by carrying out the processes in FIGS. 19 and 20. Note that the action setup window 850 in FIG. 14 is a pop-up window displayed by the same method as that in FIG. 7. The difference in action from that in FIG. 7 lies in the particulars of the action. The action "Bow" is set in the action menu 1552. The character whose name is MARY is set in the character menu 1553. Among the sliders 1555, one is used to set the speed or the like of the action with the mouse and the other indicates the degree, for example, of the action, such as bowing with a respectful attitude or making a slight bow and so on, which is set with the mouse.

At this time, as shown in FIG. 14, the operator selects "User's View Point" on the view point menu 702 with the mouse, and sets the "Front of MARY" on the position menu 1503. By these steps, the user's view point is switched to the position of the camera 1206 in FIG. 11. Consequently, the CG character B 606 taken from the user's view point 1206 appears on the preview display screen 1501. From the image of this view point, the operator can check the "bowing" action of the CG character B 606 at a short distance.

Note that this user's view point (camera 1206 or 1207) moves along with the movement of the CG character such that the this user's view point is always located in front of the CG character. For this reason, after the CG character B walked in the CG studio, if the operator feels it necessary to check over again the movement of her mouth when she spoke her lines or review her bowing action, the images can be brought back on the preview display screen 1501 simply by changing over the user's view point menu 702 and the position menu 1503.

Description will now be made of the projection method conversion menu 604 in FIG. 1.

In order to more accurately set the arrangement of objects in the CG studio regardless of the depth of the scene, the projection method of the user's view point can be switched from perspective projection to orthogonal projection.

When the projection transformation adopts perspective projection, the apparent arrangement and size of the objects in the CG studio change with their positions in the depth (Z-axis) direction. More specifically, the deeper the objects in the scene are located, the more they appear to be displaced toward the vanishing point and the smaller they become in size. In contrast, when orthogonal projection is adopted, the apparent arrangement and size of the objects are fixed regardless of their positions in the depth direction.

For example, when one wishes to have a plurality of CG characters arranged in line in the depth direction, if the projection transformation uses perspective projection, the apparent arrangement and size of the individual CG characters change progressively with their positions in the depth direction, which makes it difficult to make sure if they are arranged in line. On the contrary, in the case of orthogonal projection, because the apparent arrangement and size of the individual characters are fixed regardless of their positions in depth direction, it is possible to accurately check if they are arranged in line and setting up scenes is made easy.

The GUI for changing over the mode of projection transformation is used for the projection transformation menu 604. The projection transformation can be switched to orthogonal projection by selecting it on the projection transformation menu 604. The projection transformation menu includes two methods, "perspective projection" and "orthogonal projection" as shown on the relevant menu 804 in FIG. 10A.

Description will next be made of the user's view point adjust button 605 in FIG. 1.

Examples of the positions of the user's view point in the CG studio are shown in FIGS. 11 and 12 which, however, do not meet all requirements. There are cases requiring a solution: when the object in the CG studio that the operator wants to check is outside of the visual fields of the user's view points, when there are only a few of those objects the operator wants to check in the image, and when there is something that obstructs the operator's view of the object he wants to check. To clear those cases, if it is made possible for the operator to adjust the position and the angle of the user's view point to have the desired object displayed, then the availability of the user's view point will improve.

If the operator wants to adjust the position and the angle of the user's view point, he does so on the user's view point adjust window. An example of the user's view point adjust window will be described with reference to FIGS. 9 and 14.

In the case of FIG. 9, the front—user's view point camera 1201 in FIG. 11 is selected. To adjust the user's view point, the operator clicks on the user's view point adjust button 605 with the mouse, by which the user's view point adjust window 820 (FIG. 10A) appears.

The user's view point adjust window 820 will be described in the following.

The user's view point position display column clearly shows the user's view point position selected on the position menu 603 (FIG. 1). The position and the camera angle and the visual angle of the user's view point are set by changing the values of the X-coordinate text field 822, the Z-coordinate text field 823, the Y-coordinate text field 824, the pan-angle text field 825, the tilt-angle text field 826, the roll-angle text field 827, and the visual angle text field 828.

Those values are values on the coordinate system shown in FIG. 17. The relation among those values is as follows. The value in the X-coordinate text field 822 is on the X-axis 1801. The value in the Z-coordinate text field 823 is on the Z-axis 1802. The value in the Y-axis text field 824 is on the Y-axis 1804. The unit of the three coordinates is the meter, for example. The value in the tilt-angle text field 825 is the value of a pan-angle 1805. The value in the tilt-angle text field 826 is the value of a tilt-angle 1806. The value in the roll-angle text field 827 is the value of a roll-angle 1807. The value of the visual angle text field 828 is the value of a visual angle 1808. The unit of the angles mentioned above is the meter, for example.

The position and the camera angle and the visual angle of the user's view point, which have been adjusted, are initialized by clicking on the default button 829 with the mouse.

Figure 10B:
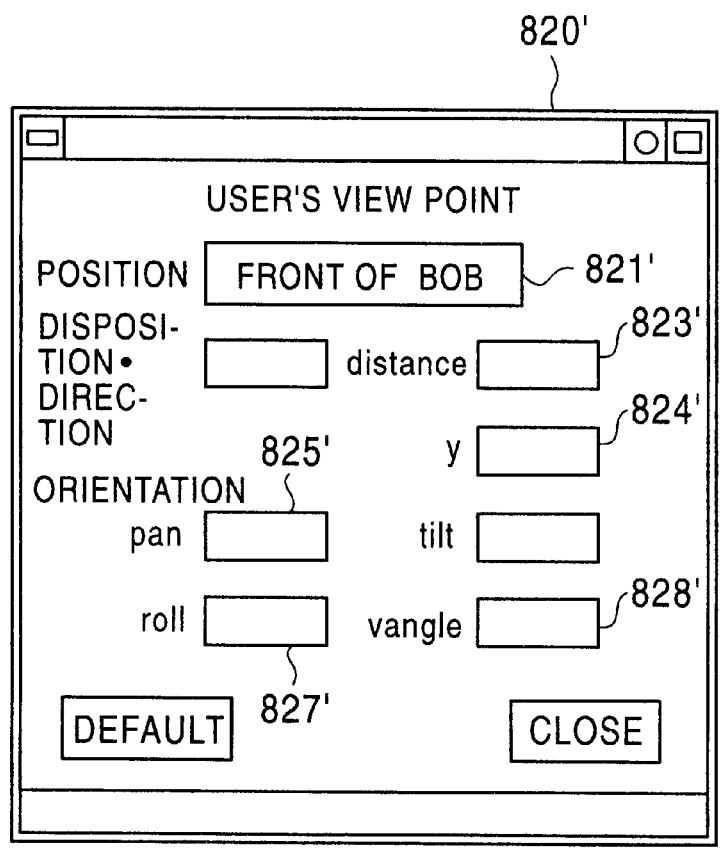
FIG. 10B is a view showing, by way of example, a window for setting a user's view point according to an embodiment of the present invention.

If the user's view point 1206, 1207 or the like has been selected, the user's view point adjust window will appear as shown in the user's view point adjust window 820' in FIG. 10B. The values of the parameters set from this window are the values on the coordinate system shown in FIG. 18. The relation among them is that the value in the viewing direction text field 822' is the value of the direction 1903 in which the user's view point camera looks (takes images) and the value in the distance text field 823' is the value of the distance 1910.

When the close button 830 is clicked on with the mouse, the adjusted values of the position and the camera angle and the visual angle of the user's view point are stored in the internal data area of the memory 102, and the user's view point adjust window 820 closes.

When previewing a created TV program from the beginning to the end with the preview controller 301 shown in FIG. 4, the images taken from the view points of the cameras in the CG studio are conventionally displayed, but according to the present invention, it has become possible to preview TV programs created from the user's view point.

Figure 23:
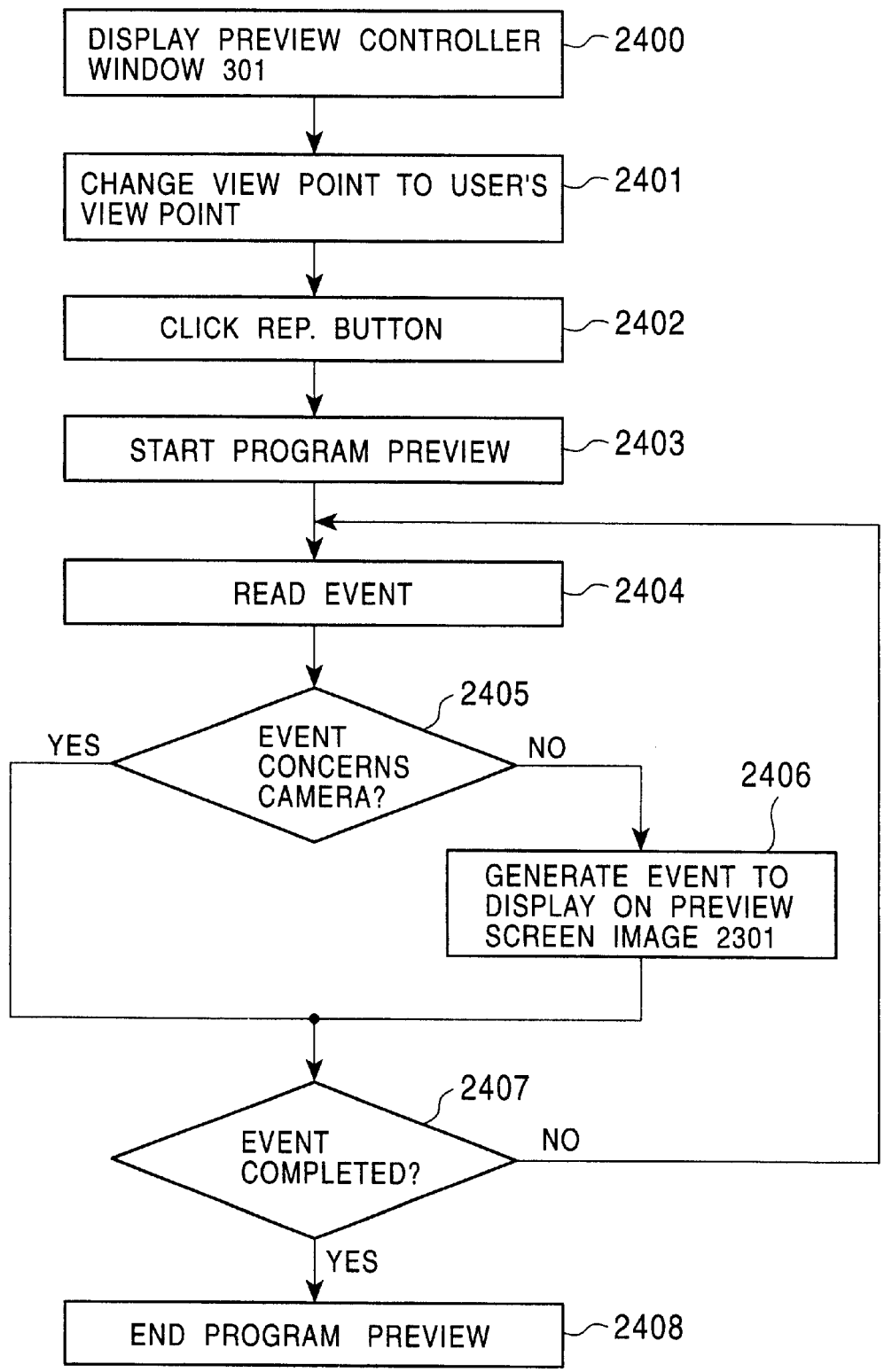
FIG. 23 is a flow chart for illustrating a processing procedure for generating a preview window in carrying out a video or TV program editing method according to an embodiment of the present invention.

An example of the process for previewing a video tape from the user's view point will be described with reference to FIGS. 22 and 23. FIG. 22 is a diagram showing an embodiment of a preview window according to the present invention. FIG. 23 is a flowchart for explaining the operation of the embodiment of the preview window according to the present invention. In FIG. 22, components like or equivalent to the components described above are designated by like reference numerals.

In a step 2400, the operator makes the preview controller window 301 to appear as shown in FIG. 22. Note that description of this operation, which has already given with reference to FIG. 4, will be omitted here.

In a step 2401, the view point is switched from the camera view point to the user's view point. In the case in FIG. 22, the view point menu 702 is set to the user's view point and the position menu 603 is set to the front.

In the next step 2402, the operator clicks on the replay button on the preview controller window 301.

In response, in a step 2403, preview of the program starts. Then, in a step 2404, one of events in the program is read.

A decision is made whether or not the event that was read in the step 2404 is an event related to the cameras in the CG studio. If the event is not related to the cameras, the operation in the step 2406 is carried out; otherwise, no operation is carried out and this routine proceeds to the next step 2407.

In a step 2407, this event is generated, and the generated event is displayed on the preview screen 2301.

In the step 2407, a decision is made whether or not the events of the program have been finished. If the events have not been finished, the routine goes back to the step 2404, and the next event is read. When the events have been finished, the routine proceeds to a step 2408 and the preview of the program terminates.

In other words, due to a conditional branch inserted in the step 2405 between the step 2404 and the step 2407, which causes the events related to the cameras in the CG studio not to be previewed, the images taken from the user's view point are displayed on the preview screen 2301 at all times.

This makes it possible to take an extensive view of the progress of the program in the CG studio from different angles at different positions in the whole studio or watch only the CG characters just in front from the front view points corresponding to the separate characters. In short, it is possible to keep quick and multi-angled control of the progress of the program.

Description has been made of the above embodiment by taking, as an example, human beings as CG characters, but needless to say, the present invention is not limited to human beings but may be applied to animals and plants and other objects, whether real or imaginary, which can be expressed as images.

In the above embodiment, the cameras are provided at predetermined positions in the CG studio, but they may be installed in other places and it should be taken for granted that they can be changed or added in the course of editing. It is also self-evident that any projection method and any parameter may be adopted as circumstances demand.

In the above embodiment, description has been made of TV program editing apparatus for production and editing of TV programs. It is obvious, however, that the present invention can be applied not only to TV programs but also to any equipment for production and editing of video information, such as moving image editing apparatus for educational video media, demonstration video material, conference material, and so on. It goes without saying that the present invention can be applied not merely to a CG studio modeled after an actual TV studio but also to any images (scenes) of virtual reality, in other words, to a space created by a combination of photographic images (scenes) and the virtual world.

As has been described, according to the present invention, when arranging objects in the CG studio, by using user's view points set in the CG studio, it was easy to comprehend the positional relationship of the objects, which facilitated the arrangement of the objects.

An effect of the embodiment of the present invention is that when confirming the CG characters' action, by watching through the user's view point always set in front of the characters, the characters' action could be checked at a short distance and program editing work could be carried out efficiently.

As for another effect of the embodiment of the present invention, when one wishes to accurately grasp the arrangement of the objects in the CG studio, by changing the projection transformation of the user's view point to orthogonal projection, the arrangement of the objects could be grasped accurately regardless of the depth of the scene.

Yet another effect of the embodiment of the present invention is that the operator could easily change the position and the angle of the user's view point and watch only objects he or she wanted to see.

A further effect of the embodiment of the present invention is that in the general preview of the program, by using the extensive user's view points of the whole CG studio or the user's view points for looking only at the individual characters' action, not through the camera's view point, the progress of the program could be grasped quickly and from multiple angles.

Apparatus for applying the editing method according to the present invention can be realized by a general-purpose computer. A system for applying the editing method according to the present invention includes a CPU that operates by a program of the editing method, a ROM containing the program and necessary data, a RAM for temporary storage of data and part of the program, an I/O port for controlling exchange of signals with the external devices, and a bus for connecting those units. A program for the editing method according to the present invention is stored in a recording medium, such as an optical disk or a flexible disk in a computer-readable code format, and may be used by downloading it to the memory device of a computer.

What is claimed is:

1. A method of editing a video program including computer graphics animation, comprising the steps of:

setting a camera view point as a view point of images of said video program broadcasted and a user's view point for editing images picked up from said camera view point, said user's view point being different from said camera view point;

storing said images picked up from said camera view point and user's view point, respectively, in a storage unit;

reading out said images of said camera view point from said storage unit and displaying said images thereon a screen of a display unit;

reading out said images of said user's view point from said storage unit and displaying said images thereof on the screen of said display unit; and editing said images picked up by said camera view point in accordance with said images picked up from said user's view point.

2. A method for editing a video program according to claim 1, wherein said video program comprises objects on a computer graphics (CG) studio, having coordinate values of said users view point in a coordinate system of the CG studio setup data, a camera angle and a visual angle of said user's view point with respect to said CG studio, which are previously stored in said storage unit, and said setup data of said user's view point is read out from said storage unit in response to a command issued by an operator through input means and an image of said CG studio taken from said user's view point is displayed on the screen of said display unit.

3. A method of editing a video program according to claim 2, wherein a plurality of different user's view points are set and an image of said CG studio taken from a selected user's view point is displayed in response to selection by the operator through said input means.

4. A method of editing a video program according to claim 2, wherein said setup data of said user's view point is displayed on the screen of said display unit and the values of said setup data can be changed through said input means.

5. A method of editing a video program according to claim 2, wherein coordinate values of said object in the coordinate system of said CG studio are stored in said storage unit, and said user's view point moves according to the movement of said object on said CG studio based on relationship between the coordinate values of said objects and said user's view point.

6. A method of editing a video program according to claim 1, wherein an object is arranged in said CG studio, and said camera view point, linked in motion with said object in the CG studio, moves keeping its relative position with said object.

7. A method of editing a video program according to claim 1, wherein either one of said image taken from said user's view point by perspective projection or orthogonal projection is selected and displayed on the screen of said display unit.

8. A method of editing a video program according to claim 1, wherein setup data concerning objects taken from said camera view point includes at least one of data concerning the position of said objects arranged in said CG studio, data concerning speech by said objects, and data concerning the action of said objects.

9. A method of editing a video program according to claim 1, wherein a preview window is displayed on the screen of said display unit, and images of said video program edited from said user's view point are reproduced in said preview window.

10. A computer program product comprising:

a computer usable medium having computer-readable program code means embodied therein for displaying images for editing a video program including computer graphics animation, wherein said computer-readable program code means includes;

means for setting a camera view point as a view point of images of said video program broadcasted and a user's view point for editing images picked up from said camera view point, said user's view point being different from said camera view point;

means for storing said images picked up from said camera view point and user's view point, respectively, in a storage unit;

means for reading out said images of said camera view point from said storage unit and displaying said images thereof on a screen of a display unit;

means for reading out said images of said user's view point from said storage unit and displaying said images thereof on the screen of said display unit; and means for editing said images of said camera view point in accordance with said images of said user's view point.

11. A computer program product according to claim 10, wherein image information is written in Television-program Making Language.

* * * * *